(12) United States Patent
Broggi

(10) Patent No.: US 12,505,568 B1
(45) Date of Patent: Dec. 23, 2025

(54) GENERATING 3D VISUALIZATION ON 3D DISPLAY UTILIZING 3D POINT CLOUD FROM MULTIPLE SOURCES

(71) Applicant: Ambarella International LP, Santa Clara, CA (US)

(72) Inventor: Alberto Broggi, Parma (IT)

(73) Assignee: Ambarella International LP, Santa Clara, CA (US)

( * ) Notice: Subject to any disclaimer, the term of this patent is extended or adjusted under 35 U.S.C. 154(b) by 462 days.

(21) Appl. No.: 17/747,736

(22) Filed: May 18, 2022

(51) Int. Cl.
| | |
|---|---|
| *G06T 7/593* | (2017.01) |
| *G06T 15/20* | (2011.01) |
| *G06T 19/20* | (2011.01) |
| *G06V 20/56* | (2022.01) |
| *G06V 20/70* | (2022.01) |

(52) U.S. Cl.
CPC ............ *G06T 7/593* (2017.01); *G06T 15/205* (2013.01); *G06T 19/20* (2013.01); *G06V 20/56* (2022.01); *G06V 20/70* (2022.01); *G06T 2207/10012* (2013.01); *G06T 2207/10028* (2013.01); *G06T 2207/20084* (2013.01); *G06T 2219/2012* (2013.01)

(58) Field of Classification Search
CPC ....... G06T 7/593; G06T 15/205; G06T 19/20; G06T 2207/10012; G06T 2207/10028; G06T 2207/20084; G06T 2219/2012; G06T 17/00; G06T 2207/10024; G06T 2207/10016; G06T 7/73; G06T 7/55; G06T 2207/20081; G06T 2207/10021; G06T 2200/08; G06T 7/50; G06T 2207/30252; G06T 19/00; G06T 7/33; G06T 2219/2004; G06T 2207/20221; G06T 2200/04; G06T 15/08; G06V 20/56; G06V 20/70; G06V 20/52; G06V 20/64; G06V 10/82; G06V 20/586; G06V 20/58; G06V 20/588; H04N 13/271; H04N 2013/0081; H04N 13/243; H04N 13/344; H04N 13/128; H04N 13/204; H04N 13/122; H04N 13/275; H04N 13/106; H04N 13/10
See application file for complete search history.

(56) References Cited

U.S. PATENT DOCUMENTS

| | | | |
|---|---|---|---|
| 11,117,570 B1 * | 9/2021 | Broggi ................. | G06V 20/586 |
| 2015/0314682 A1 * | 11/2015 | Enriquez Ortiz ...... | G02B 30/30 |
| | | | 701/49 |
| 2016/0034048 A1 * | 2/2016 | Tanaka .................. | G06F 3/0304 |
| | | | 345/158 |
| 2016/0094808 A1 * | 3/2016 | Cerri ........................ | B60R 1/27 |
| | | | 348/36 |

(Continued)

*Primary Examiner* — Henok Shiferaw
*Assistant Examiner* — Oo C Rhim
(74) *Attorney, Agent, or Firm* — Maiorana Patent Law, PA

(57) ABSTRACT

An apparatus comprises an interface and a processor. The interface may be configured to receive at least four pixel data streams corresponding to an exterior view from a vehicle. The processor may be configured to process the at least four pixel data streams arranged as video frames, calculate depth information for each pixel of the at least four pixel data streams using the video frames, calculate a 3D point cloud by fusing the depth information for each of the at least four pixel data streams, and generate 3D images for a 3D display in response to the 3D point cloud. The 3D display may be configured to direct an autostereoscopic image to a viewer.

19 Claims, 12 Drawing Sheets

(56) References Cited

U.S. PATENT DOCUMENTS

| | | | |
|---|---|---|---|
| 2016/0209647 A1* | 7/2016 | Fürsich | G02B 27/0075 |
| 2017/0085863 A1* | 3/2017 | Lopez | H04N 13/261 |
| 2017/0142396 A1* | 5/2017 | Peterson | H04N 13/128 |
| 2017/0305348 A1* | 10/2017 | Foley | G06T 15/005 |
| 2018/0072320 A1* | 3/2018 | Fattal | G08G 1/167 |
| 2018/0147985 A1* | 5/2018 | Brown | G03B 17/54 |
| 2019/0004535 A1* | 1/2019 | Huang | H04N 13/254 |
| 2020/0177862 A1* | 6/2020 | Routhier | H04N 13/122 |
| 2020/0364892 A1* | 11/2020 | Ko | G05D 1/12 |
| 2021/0023992 A1* | 1/2021 | Broggi | G02B 27/0101 |
| 2021/0055548 A1* | 2/2021 | Rao | G06T 19/006 |
| 2021/0174580 A1* | 6/2021 | Mundy | G06F 16/587 |
| 2022/0180106 A1* | 6/2022 | Voodarla | G06N 3/08 |
| 2022/0217301 A1* | 7/2022 | Ballard | H04N 7/144 |
| 2024/0007607 A1* | 1/2024 | Da Veiga | H04N 13/275 |

\* cited by examiner

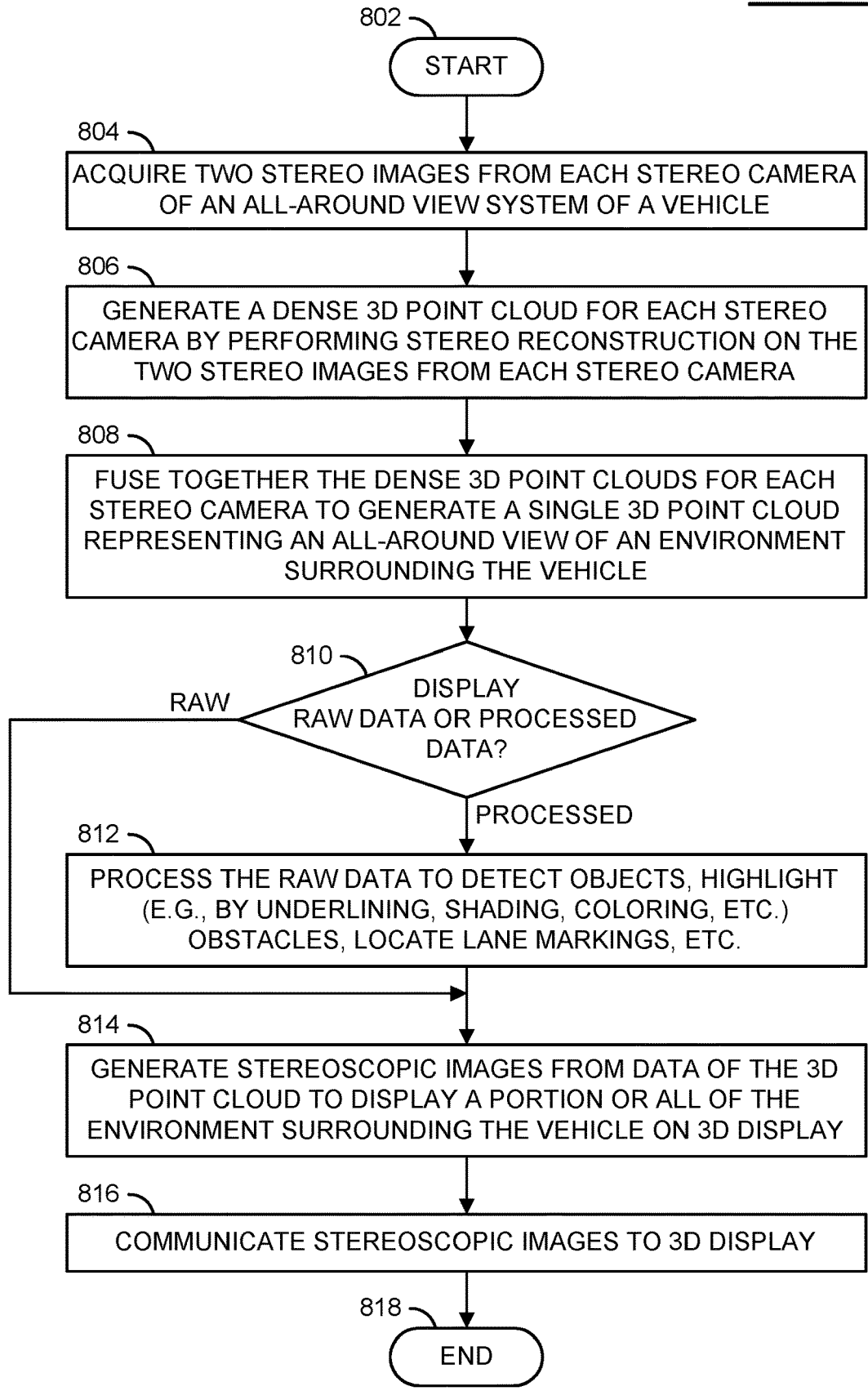

GENERATING 3D VISUALIZATION ON 3D DISPLAY UTILIZING 3D POINT CLOUD FROM MULTIPLE SOURCES

FIELD OF THE INVENTION

The invention relates to camera systems generally and, more particularly, to a method and/or apparatus for generating a 3D visualization on a 3D display utilizing a 3D point cloud from multiple sources.

BACKGROUND

Surround view systems on vehicles are used to provide parking assistance. Existing surround view systems present a two-dimensional (2D) image generated by stitching video streams from cameras mounted on the sides of the vehicle. It can be difficult to understand what is being shown because objects appear very distorted. Attempts at rendering three-dimensional (3D) information obtained from a stereo surround view have not been successful.

When trying to render a 3D point cloud into a 2D image, problems that arise can include, but are not limited to, finding a correct point of view, moving the point of view to provide a 3D sensation to a viewer, and filling holes in the 3D point cloud (which might not be complete).

It would be desirable to implement a system for generating a 3D visualization on a 3D display utilizing a 3D point cloud from multiple sources.

SUMMARY

The invention concerns an apparatus comprising an interface and a processor. The interface may be configured to receive at least four pixel data streams corresponding to an exterior view from a vehicle. The processor may be configured to process the at least four pixel data streams arranged as video frames, calculate depth information for each pixel of the at least four pixel data streams using the video frames, calculate a 3D point cloud by fusing the depth information for each of the at least four pixel data streams, and generate 3D images for a 3D display in response to the 3D point cloud. The 3D display may be configured to direct an autostereoscopic image to a viewer.

BRIEF DESCRIPTION OF THE FIGURES

Embodiments of the invention will be apparent from the following detailed description and the appended claims and drawings.

FIG. 12 is a flow diagram illustrating a process in accordance with an embodiment of the invention.

DETAILED DESCRIPTION OF THE EMBODIMENTS

Figure 1:
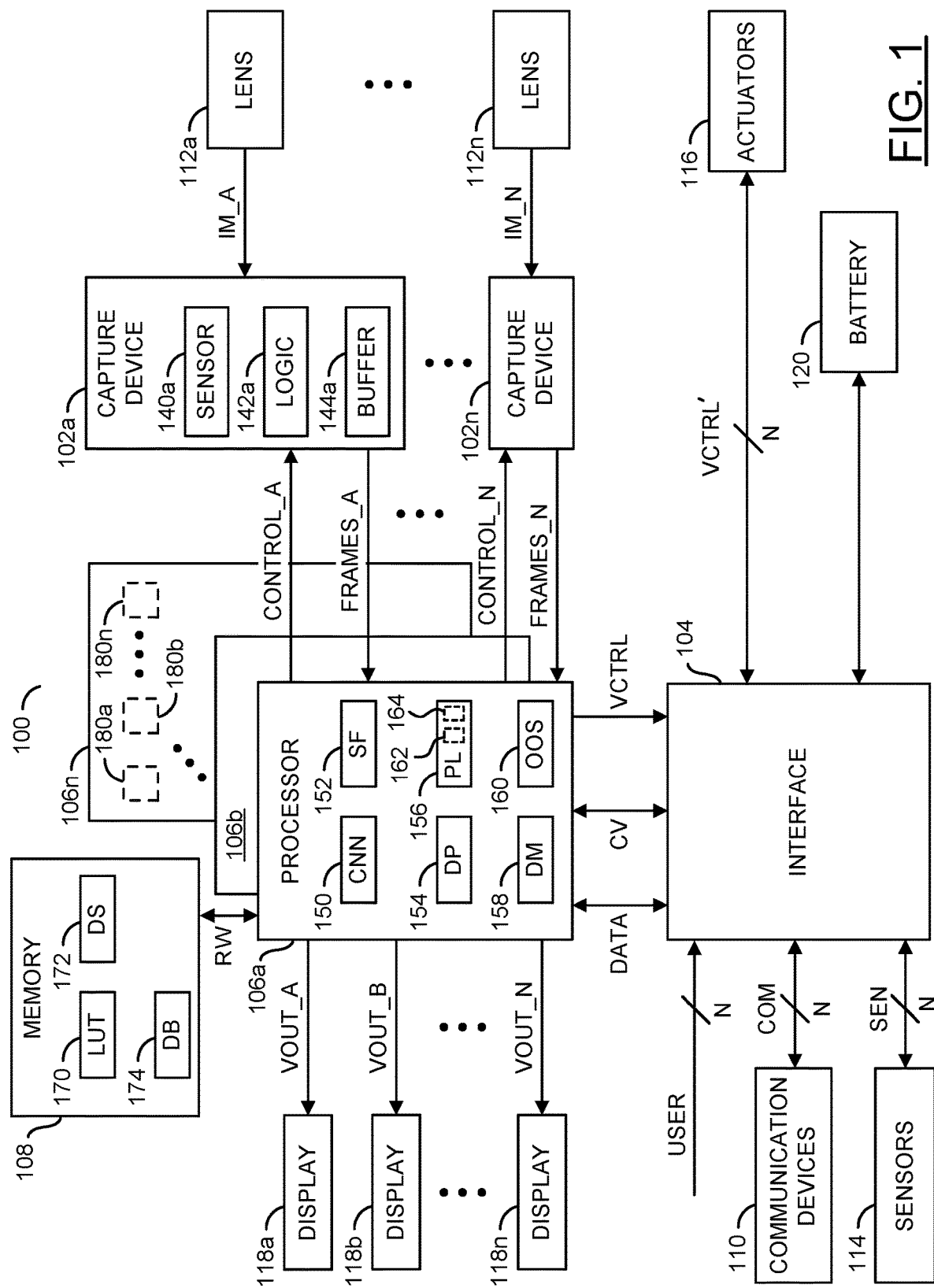
FIG. 1 is a diagram illustrating an apparatus in accordance with an embodiment of the invention.

Embodiments of the invention include providing a system for generating a 3D visualization on a 3D display utilizing a 3D point cloud from multiple sources that may (i) generate two vertically interleaved stereo images, (ii) display each of the vertically interleaved stereo images to a different respective eye of a viewer, (iii) locate and/or adjust 3D displays based on a position of a driver, (iv) generate a 3D point cloud representing an all-around environment of a vehicle, (v) generate a single, fused, 3D point cloud by fusing a plurality of individual 3D point clouds, (v) generate a 3D point cloud by fusing depth information from a plurality of surround view cameras of the vehicle, (vi) generate the 3D point cloud in real time, (vii) generate depth information for pixels using a stereo triangulation process, (viii) determine a road plane, (ix) optionally remove points that are not on the road plane from the 3D point cloud, (x) highlight detected objects on a 3D display, (xi) use color to highlight or underline objects, (xii) use color to highlight free space, and/or (xiii) be implemented as one or more integrated circuits.

In various embodiments, a surround view system may be provided that utilizes a three-dimensional (3D) display screen to display a 3D visualization of a 3D point cloud instead of turning the 3D point cloud into a 2D image. In various embodiments, vertically interleaved stereo images may be generated from the 3D point cloud to provide 3D information to a viewer. In an example, two vertically interleaved stereo images may be communicated to a 3D display configured to direct one image to one eye (e.g. left eye) of the viewer and the other image to the other (e.g., right) eye of the viewer. By using a 3D display, 3D information of the 3D point cloud computed on the fly (in real time) by the surround view system may be presented to the viewer in a more clearly understood manner. In an example, the 3D display may be implemented using existing techniques. In an example, the 3D display may be adjustable by the viewer to optimize the 3D experience based upon a seat position and/or height of the viewer. The rendering of the 3D information utilizing two vertically interleaved stereo images and a 3D display may provide an improved viewer experience and make detecting objects around the vehicle (even with strange shapes) easier than with a traditional 2D display.

In an example, the surround (or all-around) view system may be configured to generate the point cloud by fusing depth information obtained from four or more stereo camera systems that are registered (e.g., intercalibrated) together. In some embodiments, additional (optional) features may be added. In an example, the surround view system may estimate a plane of a road on which the vehicle is located. In an example, 3D points that are not on the road plane may be removed. In an example, objects around the vehicle may be highlighted on the 3D display. In an example, color may be used to underline (or highlight) objects around the vehicle. In an example, color may be used to paint free space (e.g., an open parking space, etc.) around the vehicle. In an example, light sources (e.g., light emitting diodes (LEDs) or LED strips) may be added around the vehicle to reduce or eliminate dark spots that may make imaging difficult.

Referring to FIG. 1, a diagram illustrating an apparatus in accordance with an embodiment of the invention is shown. In various embodiments, an apparatus 100 may be implemented to provide a surround view camera system in accordance with an embodiment of the invention is shown. In various embodiments, the apparatus 100 may be configured to obtain pixel data (e.g., as pixel data streams) from a plurality of cameras distributed around a vehicle. In an example, the apparatus 100 may be configured to process the pixel data as one or more frames (e.g., image frames, video frames, etc.). In an example, the apparatus 100 may be configured to perform real-time processing of the pixel data. In an example, the apparatus 100 may be configured to generate a 3D point cloud of a surround environment of a vehicle. In an example, the apparatus 100 may be configured to generate the 3D point cloud by fusing stereo information of pixel data streams from four or more stereo cameras. In an example, the apparatus 100 may be configured to generate two vertically interleaved stereo images from the 3D point cloud to render 3D information to an occupant (e.g., driver, etc.) of a vehicle. In an example, the apparatus 100 may be configured to render the 3D information using a 3D display of the vehicle.

In an example, the apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116, blocks (or circuits) 118a-118n and/or a block (or circuit) 120. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The circuit 120 may implement a power storage device (e.g., a battery). The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard or protocol (e.g., Bluetooth, Wi-Fi, LTE, CAN bus, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a vehicle). Some of the lenses 112a-112n may be implemented to provide a targeted view of an interior of the object (e.g., a cabin or passenger compartment of the vehicle). The lenses 112a-112n may each capture and/or focus light as input data (e.g., IM_A-IM_N) and present the respective light input data IM_A-IM_N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a stereoscopic and/or panoramic view of the environment and/or the interior of the vehicle. The lenses 112a-112n may be arranged to capture fields of view above and/or below a level of the vehicle. In some embodiments, lenses 112a-112n may be implemented having a wide angle (or fisheye) lens. A panoramic video may be generated comprising a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to (i) receive a respective one of the signals IM_A-IM_N, (ii) receive a respective signal (e.g., CONTROL_A-CONTROL_N), and/or (iii) present a respective signal (e.g., FRAMES_A-FRAMES_N).

The capture devices 102a-102n may each be configured to generate raw pixel data in response to the signals IM_A-

IM_N (e.g., perform a photoelectric conversion). The capture devices 102a-102n may be configured to present pixel data as an analog signal or as a digital signal (e.g., perform an analog to digital conversion). The capture devices 102a-102n may capture data received through the lenses 112a-112n to generate raw pixel data and/or video image data. In an example, the capture devices 102a-102n may present the raw pixel data in Bayer pattern, RGB, or YUV formats. In some embodiments, the capture devices 102a-102n may generate video frames. In some embodiments, the capture devices 102a-102n may generate raw pixel data and the processors 106a-106n may generate the video frames from the raw pixel data.

The signals FRAMES_A-FRAMES_N may comprise raw pixel data, video frames and/or still images generated by the capture devices 102a-102n (e.g., video data). In the example shown, the signals FRAME S_A-FRAME S_N (e.g., video frames) may be communicated from the capture devices 102a-102n to the processors 106a-106n. In another example, signals comprising the raw pixel data may be communicated from the capture devices 102a-102n to the processors 106a-106n and the processors 106a-106n may generate the signals FRAMES_A-FRAMES_N (e.g., the signals FRAMES_A-FRAMES_N may be generated internal to the processors 106a-106n). In some embodiments, the capture devices 102a-102n may be directly connected to the processors 106a-106n. In some embodiments, the capture devices 102a-102n may be connected to the processors 106a-106n by respective cables. In an example, the capture devices 102a-102n may be connected to the processors 106a-106n using a serial communication protocol between serializer-deserializer pairs.

In some embodiments, the capture devices 102a-102n and/or the processors 106a-106n may be configured to perform depth (or distance) sensing (e.g., the signals FRAMES_A-FRAMES_N may comprise depth (or distance) information and/or vector light data in addition to the video frames). In one example, the capture devices 102a-102n and/or the processors 106a-106n may perform depth (or distance) sensing using multiple cameras (e.g., cameras configured as a stereo pair to capture a depth map). In another example, the capture devices 102a-102n and/or the processors 106a-106n may perform depth (or distance) sensing using time-of-flight. In yet another example, the capture devices 102a-102n and/or the processors 106a-106n may perform depth (or distance) sensing using structured light.

The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a computer area network (CAN) bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement one or more artificial neural network (ANN) modules. In an example, the block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may omit one or more of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example, the processors 106a-106n may be configured to generate the video data (e.g., VOUT_A-VOUT_N) for the displays 118a-118n in response to the video frames (e.g., FRAME S_A-FRAME S_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-

106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps (or operations). In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a lidar device, an array of lidar devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. In some embodiments, the actuators 116 may implement speakers (interior or exterior speakers). In one example, the actuators 116 may implement speakers that have been mandated by federal regulations for all new electric vehicles to make noise when the vehicle is moving at low speed (e.g., to alert pedestrians. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera display and/or a bird's-eye view camera display. The displays 118a-118n may display aversion of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real-time video streaming to the displays 118a-118n via the signals VOUT_A-VOUT_N.

In an example, one or more of the displays 118a-118n may be implemented as an autostereoscopic display. In an autostereoscopic method, glasses are not necessary to see a stereoscopic (3D) image. In an example, a display may be implemented incorporating at least one of lenticular lens and parallax barrier technologies. Lenticular lens and parallax barrier technologies involve imposing two (or more) images on the same sheet, in narrow, alternating strips, and using a screen that either blocks one of the two strips of the images (in the case of parallax barriers) or uses equally narrow lenses to bend the strips of image and make it appear to fill the entire image (in the case of lenticular prints). In various embodiments, the displays 118a-118n implemented as an autostereoscopic display are generally positioned so that one eye of the viewer sees one of the two images and the other eye of the viewer sees the other of the two images to produce the stereoscopic effect.

The battery 120 may be configured to provide a power supply to a vehicle. In an example, the battery 120 may comprise a car battery. The battery 120 may supply the power source for driving an electric vehicle and/or operating the accessories of an electric vehicle. The battery 120 may further provide the power source for accessory functions (e.g., displaying content on the displays 118a-118n, controlling power windows, controlling locks, controlling temperature, powering the capture devices 102a-102n, communicating using the communication devices 110, powering the sensors 114, controlling the actuators 116, powering the processors 106a-106n, etc.). The battery 120 may be configured to report a capacity to the interface 104. For example, the processors 106a-106n may be configured to read the remaining capacity of the battery 120 (e.g., a percentage of charge left).

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The camera sensor 140a may generate a bitstream comprising pixel data values. The logic 142a may transform the bitstream into a human-legible content (e.g., video data and/or video frames). In one example, the logic 142a may receive pure (e.g., raw) data from the camera sensor 140a and generate video data based on the raw data (e.g., the bitstream). For example, the sensor 140a and/or the logic 142a may be configured perform image signal processing on raw data captured and read out YUV data. In some embodiments, the sensor 140a may read out raw data and the image signal processing may be performed by the processors 106a-106n. In one example, the capture devices 102a-102n may provide a direct connection to the processors 106a-106n. In another example, the capture devices 102a-102n may be connected to the processors 106a-106n using a serializer-deserializer pair. The logic 142a may further control the lens 112a in response to the signal CONTROL_A. The memory buffer 144a may store the raw data, frames and/or the processed bitstream. For example, the memory and/or buffer 144a may be configured as a frame buffer that may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., daytime and nighttime).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. The CNN module 150 may be configured to conduct inferences against a machine learning model.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, lidar, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by lidar for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video data and/or video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real-time and/or near real-time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be configured to perform image signal processing (ISP). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, sharpening and/or chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signals VOUT_A-VOUT_N).

The video pipeline module 156 may be configured to implement a raw image pipeline for image signal processing. The video pipeline module 156 may be configured to convert image data acquired from the capture devices 102a-102n. For example, the image data may be acquired from the image sensor 140a in a color filter array (CFA) picture format. The raw image pipeline implemented by the video pipeline module 156 may be configured to convert the CFA picture format to a YUV picture format.

The raw image pipeline implemented by the video pipeline module 156 may be configured to perform demosaicing on the CFA formatted image data to obtain linear RGB (red, green, blue) image data for each picture element (e.g., pixel). The raw image pipeline implemented by the video pipeline module 156 may be configured to perform a white balancing operation and/or color and tone correction. The raw image pipeline implemented by the video pipeline module 156 may be configured to perform RGB to YUV color space conversion. The raw image pipeline implemented by the video pipeline module 156 may be configured to perform noise filtering (e.g., noise reduction, noise correction, etc.) and/or sharpening. The raw image pipeline implemented by the video pipeline module 156 may be configured to implement tone based non-smoothness detection and adjustment. Generally, noise filtering may be performed after each step, operation, and/or conversion performed to reduce any noise introduced by each step.

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results. The video pipeline module 156 may comprise multiple pipelines, each tuned to perform a particular task efficiently.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118*a*-118*n* (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162 and/or a block (or circuit) 164. The circuit 162 may implement a computer vision pipeline portion. The circuit 164 may implement a disparity engine. The video processing pipeline 156 may comprise other components (not shown). The number and/or type of components implemented by the video processing pipeline 156 may be varied according to the design criteria of a particular implementation.

The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real-time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The disparity engine 164 may be configured to determine a distance based on images captured as a stereo pair. Two or more of the capture devices 102*a*-102*n* may be configured as a stereo pair of cameras (e.g., a stereo camera). The capture devices 102*a*-102*n* configured as a stereo pair may be implemented close to each other at a pre-defined distance and/or have a symmetrical orientation about a central location. The capture devices 102*a*-102*n* configured as a stereo pair may be configured to capture video frames from similar, but slightly different perspectives (e.g., angled inwards to capture fields of view that overlap).

The disparity engine 164 may be configured to perform a comparison to analyze the differences between the stereo pair of images. In an example, the processors 106*a*-106*n* may detect feature points of the same object detected in both video frames captured by the capture devices 102*a*-102*n* configured as a stereo pair. The disparity engine 164 may determine distances (e.g., an offset) of the feature points and then perform calculations based on the characteristics of the stereo pair of capture devices (e.g., angle, distance apart, etc.) and the determined distances of the feature points. Based on the differences between the stereo pair of images and the pre-defined distance between the capture devices 102*a*-102*n* configured as a stereo pair, the disparity engine may be configured to determine a distance. The distance determined by the disparity engine 164 may be the distance from the capture devices 102*a*-102*n* configured as a stereo pair. In an example, the disparity engine 164 may determine a distance from the capture devices 102*a*-102*n* configured as a stereo pair to a particular object (e.g., a vehicle, a bicycle, a pedestrian, driver, a vehicle occupant, etc.) based on the comparison of the differences in the stereo pair of images captured.

The lookup table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106*a*-106*n* may be a panoramic video. The video data may be communicated over a network via the communication devices 110. For example, the network may be a bandwidth-constrained network (e.g., a wireless network). The processors 106*a*-106*n* may combine hardware de-warping, intelligent video analytics and/or digital zooming. The processors 106*a*-106*n* may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAME S_A-FRAME S_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

The processor 106n is shown comprising a number of blocks (or circuits) 180a-180n. While the blocks 180a-180n are shown on the processor 106n, each of the processors 106a-106n may implement one or more of the blocks 180a-180n. The blocks 180a-180n may implement various hardware modules implemented by the processors 106a-106n. The hardware modules 180a-180n may be configured to provide various hardware components that may be used by the processors 106a-106n to efficiently perform various operations. Various implementations of the processors 106a-106n may not necessarily utilize all the features of the hardware modules 180a-180n. The features and/or functionality of the hardware modules 180a-180n may be varied according to the design criteria of a particular implementation. Details of the hardware modules 180a-180n may be described in association with U.S. patent application Ser. No. 16/831,549, filed on Apr. 16, 2020, U.S. patent application Ser. No. 16/288,922, filed on Feb. 28, 2019 and U.S. patent application Ser. No. 15/593,463 (now U.S. Pat. No. 10,437,600), filed on May 12, 2017, appropriate portions of which are hereby incorporated by reference in their entirety.

The hardware modules 180a-180n may be implemented as dedicated hardware modules. Implementing various functionality of the processors 106a-106n using the dedicated hardware modules 180a-180n may enable the processors 106a-106n to be highly optimized and/or customized to limit power consumption, reduce heat generation and/or increase processing speed compared to software implementations. The hardware modules 180a-180n may be customizable and/or programmable to implement multiple types of operations. Implementing the dedicated hardware modules 180a-180n may enable the hardware used to perform each type of calculation to be optimized for speed and/or efficiency. For example, the hardware modules 180a-180n may implement a number of relatively simple operations that are used frequently in computer vision operations that, together, may enable the computer vision algorithm to be performed in real-time. The processors 106a-106n may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

One of the hardware modules 180a-180n(e.g., 180a) may implement a scheduler circuit. The scheduler circuit 180a may be configured to store a directed acyclic graph (DAG). In an example, the scheduler circuit 180a may be configured to generate and store the directed acyclic graph in response to the feature set information. The directed acyclic graph may define the video operations to perform for extracting the data from the video frames. For example, the directed acyclic graph may define various mathematical weighting to apply when performing computer vision operations to classify various groups of pixels as particular objects.

The scheduler circuit 180a may be configured to parse the acyclic graph to generate various operators. The operators may be scheduled by the scheduler circuit 180a in one or more of the other hardware modules 180a-180n. For example, one or more of the hardware modules 180a-180n may implement hardware engines configured to perform specific tasks (e.g., hardware engines designed to perform particular mathematical operations that are repeatedly used to perform computer vision operations). The scheduler circuit 180*a* may schedule the operators based on when the operators may be ready to be processed by the hardware engines 180*a*-180*n*.

The scheduler circuit 180*a* may time multiplex the tasks to the hardware modules 180*a*-180*n* based on the availability of the hardware modules 180*a*-180*n* to perform the work. The scheduler circuit 180*a* may parse the directed acyclic graph into one or more data flows. Each data flow may include one or more operators. Once the directed acyclic graph is parsed, the scheduler circuit 180*a* may allocate the data flows/operators to the hardware engines 180*a*-180*n* and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One or more of the dedicated hardware modules 180*a*-180*n* may be configured to extract feature points from the video frames. The CNN module 150 may be configured to analyze pixels of the video frames and/or groups of pixels of the video frame. One or more of the dedicated hardware modules 180*a*-180*n* may be configured to perform particular mathematical operations that may be performed multiple times to perform the analysis of the pixels and/or groups of pixels. The operations performed by the dedicated hardware modules 180*a*-180*n* may be configured to calculate descriptors based on the feature points. The dedicated hardware modules 180*a*-180*n* may be configured to compare the descriptors to reference descriptors stored in the memory 108 to determine whether the pixels of the video frames correspond to a particular object.

Figure 2:
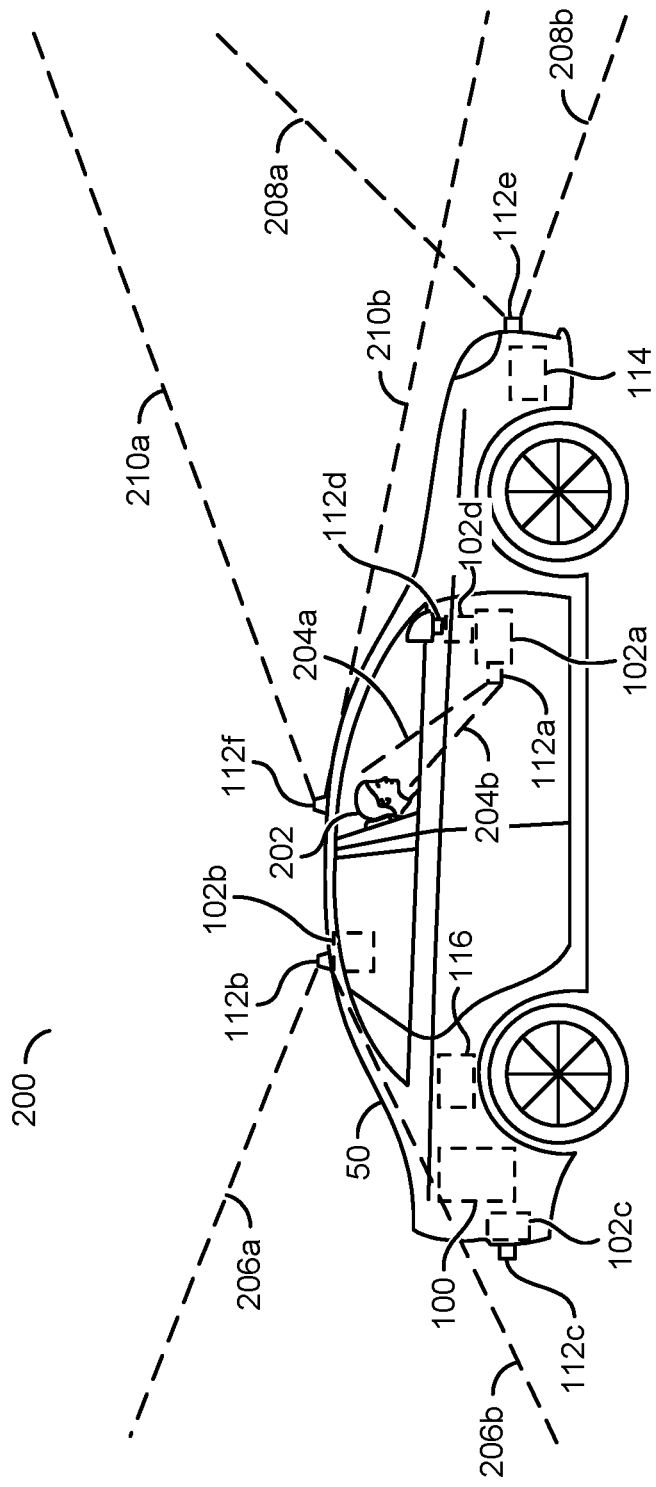
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102*a*-102*d* and/or sensors 114 such as a direct wired connection and/or a connection using a common bus line). A location of the apparatus 100 may be varied according to the design criteria of a particular implementation.

A camera (e.g., the lens 112*a* and the capture device 102*a*) is shown capturing an interior of the ego vehicle 50 (e.g., detecting the driver 202). A targeted view of the driver 202 (e.g., represented by a line 204*a* and a line 204*b*) is shown being captured by the capture device 102*a*. The capture device 102*a* may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106*a*-106*n* may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102*a*-102*n* may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112*b* and the capture device 102*b*) is shown capturing a targeted view from the ego vehicle 50. In the example shown, the targeted view from the ego vehicle 50 (e.g., represented by a line 206*a* and a line 206*b*) is shown capturing an exterior view to the rear of (e.g., an area behind) the ego vehicle 50. Similarly, other cameras may be used to capture video data of a targeted view from the vehicle (e.g., shown as the lens 112*c* and the camera sensor 102*c*, the lens 112*d* and the camera sensor 102*d*, etc.). For example, the targeted view (e.g., represented by a line 208*a* and a line 208*b* captured by the lens 112*e*) may provide a front exterior view of an area. In another example, a redundant targeted view (e.g., represented by a line 210*a* and a line 210*b* captured by the lens 112*o*) may provide an alternate front exterior view of an area. Redundant targeted views (e.g., targeted views that generally cover the same area) may provide a failover system and/or provide a secondary data set. The number of cameras implemented, a direction captured, an orientation of the cameras and/or an arrangement of the cameras may be varied according to the design criteria of a particular implementation.

The capture devices 102*a*-102*n* may be configured to capture video data of the environment around (e.g., area near) the ego vehicle 50. The processors 106*a*-106*n* may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a lidar device, an array of lidar devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106*a*-106*n* to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location, and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114, and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious), and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50 to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the use of the plurality of capture devices 102a-102n and the sensors 114 (e.g., radar, time-of-flight (ToF), occupancy sensors, temperature sensors, location/orientation sensors, ultrasonic, etc.). The type of capture devices and/or sensors implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50 was parked, when the ego vehicle 50 came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., an RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Figure 3:
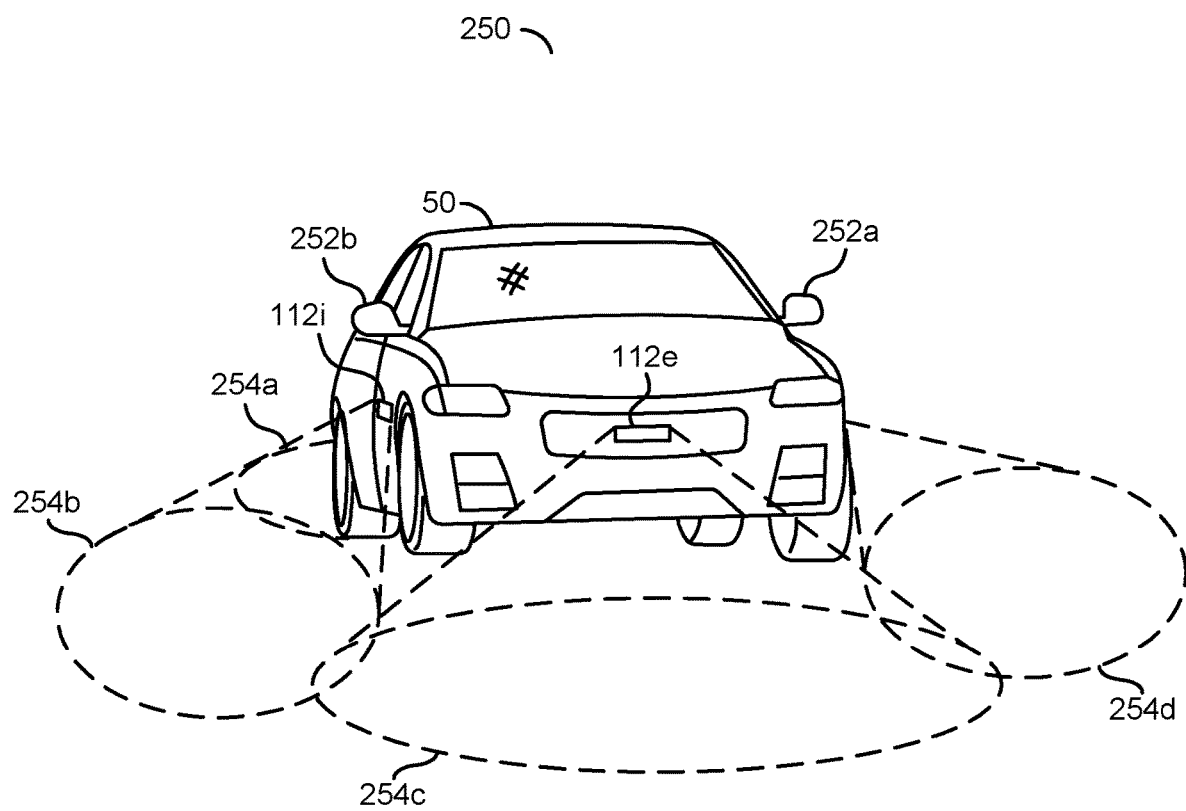
FIG. 3 is a diagram illustrating a vehicle camera system capturing an all-around view.

Referring to FIG. 3, a diagram illustrating the vehicle camera system 100 capturing an all-around view is shown. An external view 250 of the ego vehicle 50 is shown. External side view mirrors 252a-252b are shown. The side view mirror 252a may be a side view mirror on the driver side of the ego vehicle 50. The side view mirror 252b may be a side view mirror on the passenger side of the ego vehicle 50. The camera lens 112e is shown on the front grille of the ego vehicle 50. The camera lens 112i is shown on a passenger side of the ego vehicle 50. The camera lens 112i is shown below the passenger side view mirror 252b. Similarly, one of the lenses 112a-112n may be implemented at a level below the driver side view mirror 252a (not visible from the perspective of the external view 250 shown).

An all-around (or surround) view 254a-254d is shown. In an example, the all-around view 254a-254d may enable an all-around view (AVM) system. The AVM system may comprise at least four cameras (e.g., each camera may comprise a combination of one of the lenses 112a-112n (or a stereo pair of the lenses 112a-112n) and one of the capture devices 102a-102n (or a stereo pair of the capture devices 102a-102n). In the perspective shown in the external view 250, the lens 112e and the lens 112i may each be one of the at least four cameras, and the other two cameras may not be visible. In an example, the lens 112e may be a camera located on the front grille of the ego vehicle 50, one of the cameras may be on the rear (e.g., over the license plate), the lens 112i may be located below the side view mirror 252b on the passenger side and one of the cameras may be located below the side view mirror 252a on the driver side. The arrangement of the cameras may be varied according to the design criteria of a particular implementation.

Each camera providing the all-around view 254a-254d may implement a fisheye lens (e.g., the lens 112e and the lens 112i shown may be fisheye lenses) and may capture a video frame with a 180 degrees angular aperture. The all-around view 254a-254d is shown providing a field of view coverage all around the ego vehicle 50. For example, the portion of the all-around view 252a may provide coverage for a rear of the ego vehicle 50, the portion of the all-around view 252b may provide coverage for a passenger side of the ego vehicle 50, the portion of the all-around view 252c may provide coverage for a front of the ego vehicle 50 and the portion of the all-around view 252d may provide coverage for a driver side of the ego vehicle 50. Each portion of the all-around view 252a-252d may be one field of view of a camera mounted to the ego vehicle 50. Each portion of the all-around view 254a-254d may be dewarped and stitched together by the processors 106a-106n to provide an enhanced video frame that represents a top-down view near the ego vehicle 50. The processors 106a-106n may modify the top-down view based on the all-around view 254a-254d to provide a representation of a bird's-eye view of the ego vehicle 50.

The all-around view 254a-254d may be captured by four of the capture devices (e.g., 102a-102d) implemented by camera system 100. In some embodiments, the capture devices 102a-102d may be connected to an on-board processing system (e.g., a PC, a FPGA, a DSP, an ASIC, etc.). For example, the capture devices 102a-102d may be connected to the processors 106a-106n. The video processing pipeline 156 may receive the captured video frames (e.g., images) and process the video frames to create a bird's-eye view. The processors 106a-106n may be further configured to detect special patterns (e.g., QR codes and/or textured light patterns). The processors 106a-106n may be further configured to detect image features for object detection using the computer vision operations.

In various embodiments, a 3D rendering of the all-around view 254a-254d may be presented to the driver 202 on one or more of the displays 118a-118n in real-time. The 3D rendering of the all-around view 254a-254d may assist the driver 202 by providing a representation of the position of the ego vehicle 50 with respect to nearby obstacles that may be difficult to see because the body of the ego vehicle 50 may obstruct the view of the driver 202. When the driver 202 is performing a maneuver near an obstacle, the all-around view 254a-254d may be one useful perspective.

In some embodiments, the all-around view 254a-254d may be used by the processors 106a-106n to detect objects and/or determine a location of objects with respect to the ego vehicle 50 using computer vision operations. The results of the computer vision operations may enable the processors 106a-106n to understand the surroundings of the ego vehicle 50. The results of the computer vision operations may be used to enable autonomous driving of the ego vehicle 50. In one example, the processors 106a-106n may be configured to provide controls to various systems of the ego vehicle 50 (e.g., a drive train, a steering system, a braking system, etc.). In another example, the processors 106a-106n may be configured to provide the results of the computer vision operations to a system of the ego vehicle 50 that provides autonomous controls to the ego vehicle 50. The implementation of the autonomous control of the ego vehicle 50 may be varied according to the design criteria of a particular implementation.

The results of the computer vision operations performed using the video frames generated in response to the all-around view 254a-254d may be used to provide data for autonomous control of the ego vehicle 50. The autonomous control of the ego vehicle 50 may be configured to perform a vehicle maneuver. In one example, the vehicle maneuver may comprise a low-speed maneuver such as backing into and/or pulling out of a parking spot. In another example, the vehicle maneuver may comprise a low-speed maneuver such as performing parallel parking. In yet another example, the vehicle maneuver may comprise changing a lane in traffic. In still another example, the vehicle maneuver may comprise full autonomous control of the ego vehicle 50. In order to acquire the data about the objects near the ego vehicle 50, the all-around view 254a-254d may need to provide sufficient detail for object detection. For autonomous control of the ego vehicle 50, the camera system 100 may be configured to operate in various conditions (e.g., light, dark, rain, snow, sunny, etc.). The apparatus 100 may be configured to provide illumination on all sides of the ego vehicle 50 to facilitate the detection of objects within the all-around view 254a-254d.

Figure 4:
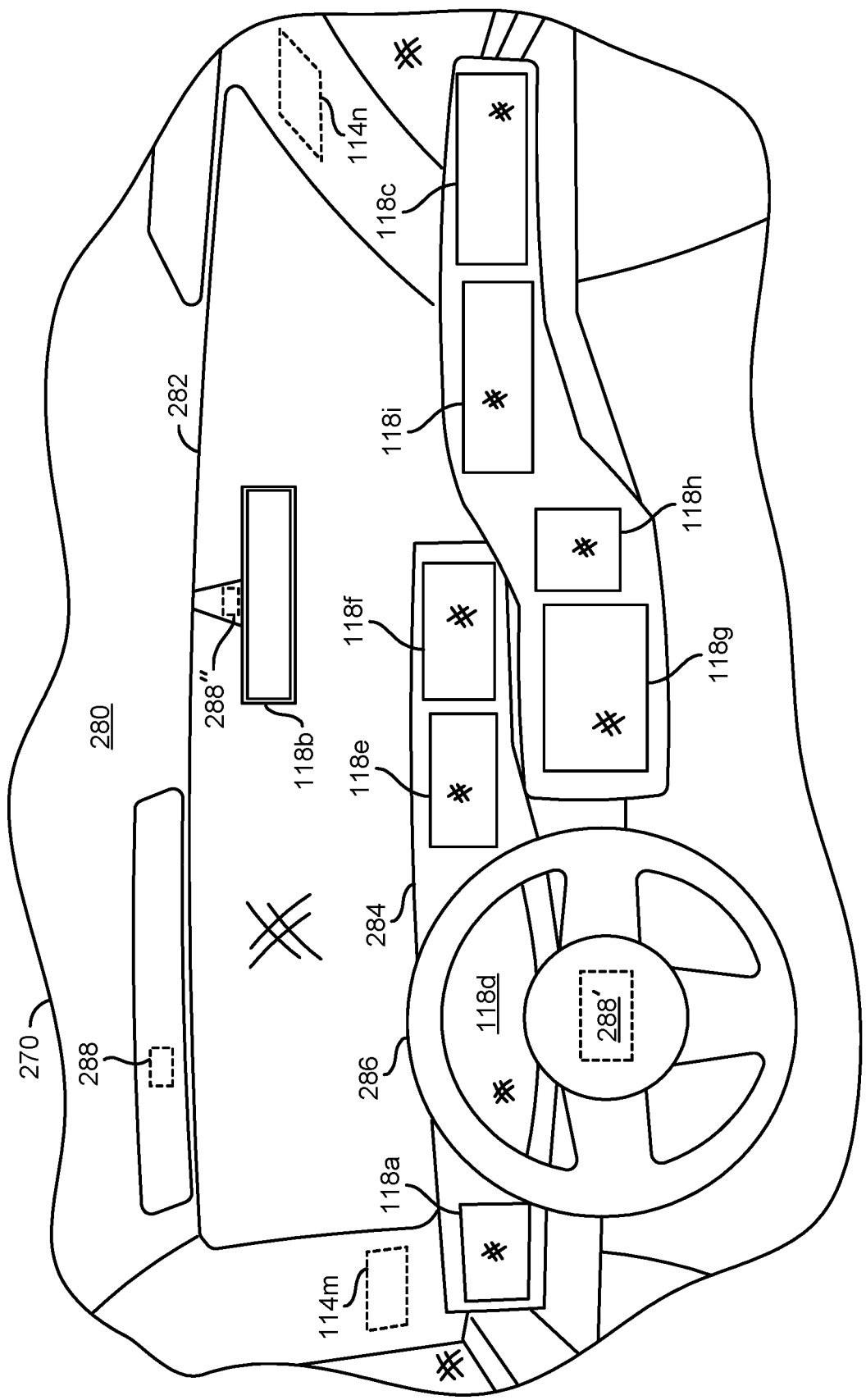
FIG. 4 is a diagram illustrating an interior of a vehicle from the perspective of a driver.

Referring to FIG. 4, a diagram illustrating an interior of the ego vehicle 50 from the perspective of the driver 202 is shown. A perspective 270 is shown. The perspective 270 may be a representation of a view of an interior 280 of the ego vehicle 50. The perspective 270 may generally provide a view of the interior 280 from the location and direction of the driver 202 but may not be what the driver 202 would actually see (e.g., may not be representative of the gaze direction 260a-260b).

The interior 280 of the ego vehicle 50 may comprise a windshield 282, a dashboard 284 and/or a steering wheel 286. A number of the displays 118a-118n are shown. In the example shown, nine displays 118a-118i are shown. However, the number of the displays 118a-118n available in the ego vehicle 50 may be varied according to the design criteria of a particular implementation. A driver monitoring systems (DMS) 288 is shown. The DMS 288 may be implemented by the processors 106a-106n. The DMS 288 is shown as part of the roof of the interior 280. The DMS 288 may comprise one of the capture devices 102a-102n and/or the lenses 112a-112n. Alternate locations for the DMS 288 are shown (e.g., the DMS 288' located on the steering wheel 286 and the DMS 288" located on the mount for the display 118b). Generally, the DMS 288 may be located to capture a view of the driver 202. The number and/or locations of the DMS 288 may be varied according to the design criteria of a particular implementation.

In the example shown, the display 118a may be located on the dashboard 284 to the left of the steering wheel 286. For example, the display 118a may be configured to display video data corresponding to a rear view from the driver side (e.g., emulating a driver side reflective mirror). In the example shown, the display 118b may be located at the top of the windshield 282. For example, the display 118b may be configured to display video data corresponding to the rear-view (e.g., emulating a traditional reflective rearview mirror). In the example shown, the display 118c may be located on the dashboard 284 to the far right of the interior 280. For example, the display 118c may be configured to display video data corresponding to the rear view from the passenger side (e.g., emulating a passenger side reflective mirror). The display 118d may be located on the dashboard 286 behind the steering wheel 286, and the displays 118e-118i may be located on the dashboard 284 at various locations to the right of the steering wheel 286. In one example, one or more of the displays 118d-118i may be configured to display the vertically interleaved stereo images forming the 3D surround view images rendered by the apparatus 100 in real time (e.g., on the fly). In another example, one or more of the displays 118d-118i may be configured to display vehicle information (e.g., warning icons, speed, distance, temperature, odometer, etc.). In yet another example, one or more of the displays 118d-118i may be configured as an infotainment touchscreen display (e.g., providing a user interface for audio, navigation, hands-free phone communication, etc.).

The processors 106a-106n may be configured to communicate any of the signals VOUT_A-VOUT_N to any of the displays 118a-118i. In an example, the user interface of the infotainment touchscreen (e.g., one of the displays 118a-118n) may be configured to enable the driver 202 (or a passenger in the ego vehicle 50) to customize the video output for each of the displays 118a-118n. In one example, the processors 106a-106n may enable one or more of the displays 118a-118n to duplicate a view. For example, the display 118a and the 118i may both display the rear view from the driver side emulating a driver side reflective mirror (e.g., to allow a driving instructor in the passenger seat to easily see the rear view from the passenger side). In another example, the display 118d and the 118g may both display the vertically interleaved stereo images forming the 3D surround view images rendered by the apparatus 100 in real time (e.g., on the fly). In another example, the processors 106a-106n may enable the driver 202 to select which of the displays 118a-118i display which video data. For example, the driver 202 may prefer to have the display 118e display the passenger side rear view instead of the display 118c, which is farther away.

The sensors 114m-114n are shown located within the interior 280 of the ego vehicle 50. The sensors 114m-114n may be configured to implement illuminance measurement sensors. In one example, the illuminance measurement sensors 114m-114n may be ambient light sensors. In the example shown, the ambient light sensors 114m-114n are in a pillar (e.g., an A pillar) of the ego vehicle 50. In some embodiments, the ambient light sensors 114m-114n may be implemented along the dashboard 284 of the ego vehicle 50. The ambient light sensors 114m-114n may be implemented in other locations (e.g., on the ego vehicle 50 exterior, on a hood of the ego vehicle 50, on a roof of the ego vehicle 50, throughout the interior of the ego vehicle 50, etc.). The location of the ambient light sensors 114m-114n may be varied according to the design criteria of a particular implementation.

The processors 106a-106n may be configured to constantly, continuously and/or periodically monitor a direction and/or intensity (e.g., brightness) of light in the interior 280. The monitoring of the direction and/or brightness of light may be performed by reading the ambient light sensors 114m-114n, receiving external information (e.g., weather data and/or location data) and/or performing the computer vision operations (individually and/or in combination). In some embodiments, the amount of light in the interior 280 may be determined using computer vision analysis of the video frames of the interior 280.

Figure 5:
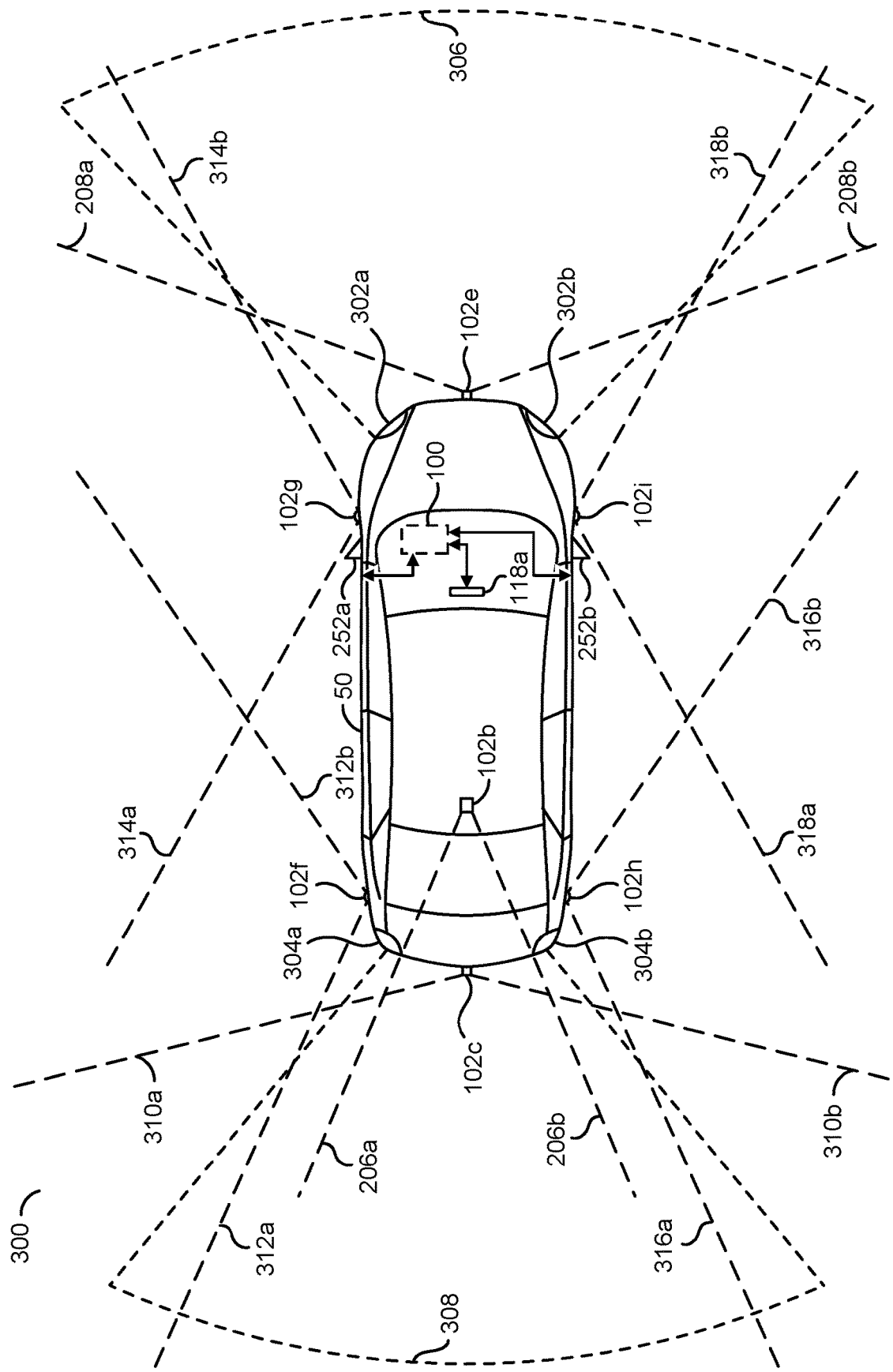
FIG. 5 is a diagram illustrating an exterior view from a vehicle and areas of illumination around a vehicle.

Referring to FIG. 5, a diagram illustrating an exterior view from a vehicle and areas of illumination around the vehicle is shown. An overhead (or bird's eye) view 300 of the ego vehicle 50 is shown. The apparatus 100 is shown within the ego vehicle 50. A subset of the capture devices 102a-102n are shown on the ego vehicle 50. The display 118a is shown within the ego vehicle 50. While only one of the displays 118a is shown as a representative example, generally the ego vehicle 50 may comprise more than one of the displays 118a-118n.

Front headlights 302a-302b are shown on a front end of the ego vehicle 50. Rear taillights 304a-304b are shown on a rear end of the ego vehicle 50. The front headlights 302a-302b may be configured to provide illumination out towards the front of the ego vehicle 50. A dotted shape 306 is shown in front of the ego vehicle 50 and extending from the front headlights 302a-302b. The dotted shape 306 may represent a range of illumination generated by the front headlights 302a-302b. Similarly, a dotted shape 308 is shown behind the ego vehicle 50 and extending from the rear taillights 304a-304b. The dotted shape 308 may represent a range of illumination generated by the rear taillights 304a-304b. The color, intensity and/or range of light of the front illumination 306 and the rear illumination 308 may be varied according to the design criteria of a particular implementation.

In the example overhead view 300, the capture device 102b, the capture device 102c, the capture device 102e, the capture device 102f, the capture device 102g, the capture device 102h, and the capture device 102i are shown. Each of the capture devices 102a-102i may be directed to capture a different field of view. As shown in association with FIG. 2, the lens 112b of the capture device 102b may capture the field of view 206a-206b to provide a view behind the ego vehicle 50 and the lens 112e of the capture device 102e may capture the field of view 208a-208b to provide a view in front of the ego vehicle 50. Dotted lines 310a-310b are shown extending from the capture device 102c (e.g., from a rear bumper location). The dotted lines 310a-310b may represent the field of view captured by the lens 112c. The field of view 310a-310b may provide a wide angle field of view towards the rear of the ego vehicle 50.

Dotted lines 312a-312b are shown extending from the capture device 102f (e.g., from a rear driver side location). The dotted lines 312a-312b may represent the field of view captured by the lens 112f. The field of view 312a-312b may provide a rear driver side field of view out from the ego vehicle 50. Dotted lines 314a-314b are shown extending from the capture device 102g (e.g., located below the driver side mirror 252a). The dotted lines 314a-314b may represent the field of view captured by the lens 112g. The field of view 314a-314b may provide a driver side field of view out from the ego vehicle 50. Dotted lines 316a-316b are shown extending from the capture device 102h(e.g., from a rear passenger side location). The dotted lines 316a-316b may represent the field of view captured by the lens 112h. The field of view 316a-316b may provide a rear passenger side field of view out from the ego vehicle 50. Dotted lines 318a-318b are shown extending from the capture device 102i (e.g., located below the passenger side mirror 252b). The dotted lines 318a-318b may represent the field of view captured by the lens 112i. The field of view 318a-318b may provide a passenger side field of view out from the ego vehicle 50.

In an example, each of the fields of view captured by the lenses 112a-112n may be presented as video data to the displays 118a-118n and/or analyzed by the processors 106a-106n. The lenses 112a-112n and the corresponding fields of view (e.g., the fields of view 206a-206b, 208a-208b, 310a-310b, 312a-312b, 314a-314b, 316a-316b and 318a-318b) are shown as an illustrative example. In some embodiments, the apparatus 100 may implement an all-around view system utilizing at least four of the capture devices 102a-102n. For example, the capture device 102e implemented on a front of the ego vehicle 50, the capture device 102c implemented on arear of the ego vehicle 50, the capture device 102g implemented below the driver side view mirror 252a and the capture device 102i implemented below the passenger side view mirror 252b may be sufficient to capture the all-around view 254a-254d. In an example, the at least four capture devices 102a-102n may be implemented as part of stereo cameras, each acquiring stereo images of the respective fields of view 206a-206b, 208a-208b,310a-310b,312a-312b,314a-314b,316a-316b and 318a-318b. The arrangement of the capture devices 102a-102n may be varied according to the design criteria of a particular implementation.

The processors 106a-106n may be configured to combine the video data captured by the capture devices 102a-102n to form the all-around view 254a-254d. The exterior field of view (e.g., the all-around view 254a-254d) may be a 360 degree field of view (e.g., a field of view that captures video data in all or most directions around the ego vehicle 50, a field of view that surrounds the ego vehicle 50, etc.). Pixel data generated by the capture devices 102a-102i and the corresponding fields of view (e.g., the fields of view 206a-206b, 208a-208b, 310a-310b, 312a-312b, 314a-314b, 316a-316b and 318a-318b) and/or data from other capture devices (e.g., the capture devices 102j-102n, not shown) may be combined to enable the processors 106a-106n to have access to video data over the full 360 degree field of view.

In some embodiments, the processors 106a-106n may be configured to perform video stitching operations and/or de-warping operations to form the 360 degree field of view. In some embodiments, the processors 106a-106n may be configured to analyze the video data captured by each of the capture devices 102a-102n and aggregate the results to make inferences about all the video data in the all-around view 254a-254d (e.g., the video data from each field of view may be analyzed individually, and the results may be combined to effectively create the 360 degree field of view, even if a single video stream of all 360 degrees around the ego vehicle 50 is never actually created).

In some embodiments, the all-around view 254a-254d may have a generally circular shape for the 360 degree field of view. The particular shape of the 360 degree field of view may not be circular. For example, the range of each of the capture devices 102a-102n may be different. In another example, the physical location of the capture devices 102a-102n on the ego vehicle 50 may determine how far from the ego vehicle 50 the all-around view 254a-254d is able to reach. The available lighting may be a limitation on the range of the all-around view 254a-254d. The 360 degree field of view may have an irregular shape. The range of the 360 field of view may extend farther from the ego vehicle 50 than shown. In some embodiments, the 360 degree field of view may be spherical (e.g., capture the environment above the ego vehicle 50). In some embodiments, the all-around view 254a-254d may not be a full 360 degree field of view (e.g., locations below the ego vehicle 50 may not be captured).

The processors 106a-106n may be further configured to perform computer vision operations on the video data captured in the all-around view 254a-254d (which may provide an approximation of what the driver 202 would be able to see if the driver 202 was in the ego vehicle 50 and looking in multiple directions simultaneously) and more. For example, the computer vision operations performed by the processors 106a-106n may be configured to detect and/or recognize objects. The computer vision operations performed by the processors 106a-106n may be further configured to detect characteristics of objects and/or changes to the characteristics over time.

Vehicles generally do not have side lighting. While the front headlights 302a-302b and the rear taillights 304a-304b may provide sufficient lighting for the capture devices 102a-102n towards the front and rear of the ego vehicle 50, dark areas may remain at the sides of the ego vehicle 50. Dark areas may reduce visibility in portions of the all-around view 254a-254d. In some embodiments, side lighting (e.g., a small LED or LED strip) may be added to the sides of the ego vehicle 50 to reduce and/or eliminate dark areas. The added illumination may also improve image clarity to enable the driver 202 to have a kind of in-person view of the immediate surroundings of the ego vehicle 50.

In an example, dark areas may be caused by lack of sunlight and/or artificial light. In an example, dark areas may be caused by the time of day (e.g., lack of sunlight at night). In another example, dark areas may be caused by a shadow (e.g., an object obstructing sunlight). In yet another example, dark areas may be caused by being located within an interior environment (e.g., a parking garage may have insufficient artificial lighting).

Dark areas may result in inaccuracies in the object detection performed by the processors 106a-106n. For example, dark areas may result in less ambient light being captured by the lenses 112a-112n (e.g., weaker input signals IM_A-IM_B). Dark areas may result in video frames being generated by the processors 106a-106n that have fewer visible details. If the video frames have fewer details visible, then the CNN module 150 may not have sufficient data for analysis to detect objects.

Generally, the front illumination 306 may provide lighting that may reduce and/or eliminate dark areas within the range of the front illumination 306. For example, the front headlights 302a-302b may provide sufficient lighting towards the front of the ego vehicle 50 for the front-mounted capture device 102e. Generally, the rear illumination 308 may provide lighting that may reduce and/or eliminate dark areas within the range of the rear illumination 308. For example, the rear taillights 304a-304b may provide sufficient lighting towards the rear of the ego vehicle 50 for the rear-mounted capture device 102c. Generally, side lighting (e.g., a small LED or LED strip) added to the sides of the ego vehicle 50 may provide lighting that may reduce and/or eliminate dark areas within the range of the side illumination. For example, the side lights may provide sufficient lighting towards the sides of the ego vehicle 50 for the side-mounted capture devices 102f, 102g, 102h, and 102i.

Computer vision may be the primary source of data for the apparatus 100 to understand the environment around the ego vehicle 50. The sensor fusion module 152 may be configured to combine information about the objects detected from analyzing the video data captured with a detection of objects using the proximity sensors (e.g., one or more of the sensors 114 configured to implement radar, lidar, etc.). The sensor fusion module 152 may be further configured to mathematically weight the information received from the computer vision operations (e.g., modify coefficients to represent how likely the detections made by the computer vision operations are correct based on the detections made by the proximity sensors). For example, the sensor fusion module 152 may be configured to mathematically weight the information provided by each sensor (e.g., a confidence level of the computer vision detection, a confidence level of the detection of the sensors 114, the distance limitations of the sensors 114, whether the computer vision detects the object at a distance beyond the range of the sensors 114, etc.).

The ego vehicle 50 may implement the apparatus 100 that enables computer vision and 360 degree cameras to provide the all-around view 254a-254d and the additional sensors 114 (e.g., such as ultrasonics, radars, gyroscope, accelerometer, etc.). The additional sensors 114 may provide supplemental information about the environment near the ego vehicle 50. Some of the supplemental information may provide data about objects/obstacles near the ego vehicle 50 that the capture devices 102a-102n may not be capable of detecting because of dark areas on the sides of the ego vehicle 50. However, the additional sensors 114 may not provide sufficient information for all autonomous driving maneuvers. Furthermore, if dark areas on the sides of the ego vehicle 50 prevent computer vision operations, the results of the computer vision analysis may not be available to provide redundancy and/or error-checking for the sensors 114.

The processors 106a-106n may be configured to detect events. In some embodiments, the event may be information that warrants being brought to the attention of the driver 202. In some embodiments, the event may be information about the nearby vehicles. In some embodiments, the event may be a detected scenario that the apparatus 100 should react to autonomously (e.g., avoid collisions, provide warnings, store information, avoid roadway hazards such as potholes, etc.). For example, whether a detected scenario is considered an event may be determined by the decision module 158. In one example, the event may correspond to detecting a scenario that may correspond to an autonomous driving maneuver (e.g., detecting a parking spot). The events may be detected based on the computer vision operations performed on the video data captured using the capture devices 102a-102n. The events may be detected based on readings from the sensors 114. For example, the sensor fusion module 152 may be configured to combine information determined using the computer vision operations and information detected using the sensors 114 to make inferences that may be used by the decision module 158.

Figure 6:
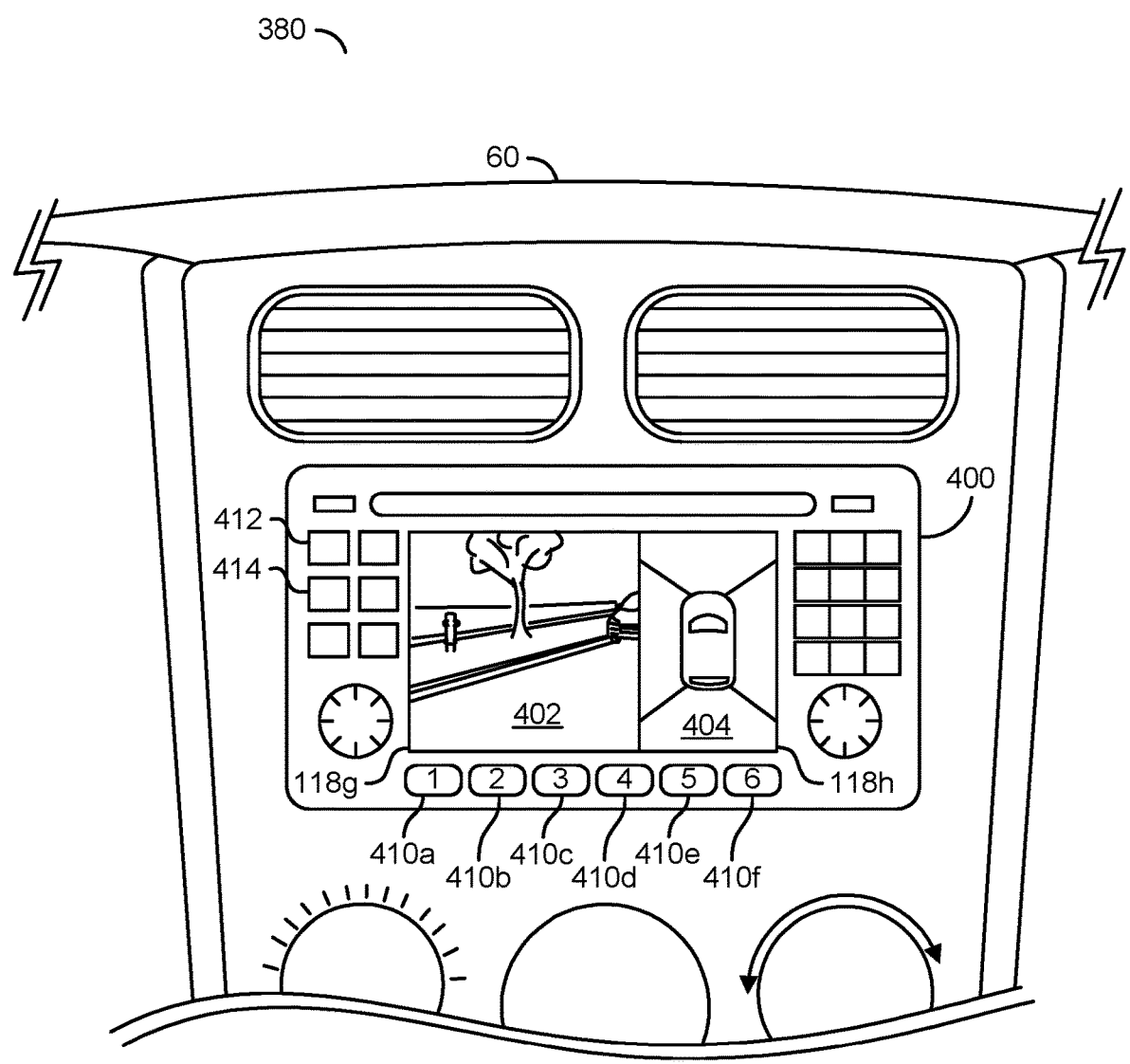
FIG. 6 is a diagram illustrating an example onboard display in accordance with an embodiment of the invention.

Referring to FIG. 6, a diagram illustrating an example onboard display is shown. A view 380 of a portion of an interior of the ego vehicle 50 is shown. For example, the view 380 may be a portion of the dashboard 284 of the ego vehicle 50. An infotainment system 400 is shown. In an example, the infotainment system 400 may provide a human-machine interface (HMI).

The infotainment system 400 may comprise a number of the displays 118a-118n. In the example shown, the infotainment system 400 comprises the display 118g and the display 118h. The infotainment system 400 may comprise a number of buttons 410a-410f, a button 412 and a button 414. In one example, the buttons 410a-410f, the button 412 and/or the button 414 may be software buttons implemented on a touchscreen display. Other input (e.g., buttons, dials, slots, software buttons, etc.) is shown on the infotainment system 400. The buttons 410a-410f may enable the driver 202 to select one of the available views captured by the capture devices 102a-102n (e.g., 6 available views in the example shown, but the number of views available may be varied according to the design criteria of a particular implementation). The button 412 may implement a save (or memorize) functionality. The button 414 may implement a reset functionality.

The display 118g is shown displaying a view 402 (e.g., a stereoscopic (3D) view). The display 118h is shown displaying a view 404 (e.g., the top down view based on the all-round views 254a-254d shown in association with FIG.

3). The display 118g may be implemented as an autostereoscopic display. In an autostereoscopic method, glasses are not necessary to see a stereoscopic (3D) image. In an example, the display 118g may be implemented incorporating at least one of lenticular lens and parallax barrier technologies. Lenticular lens and parallax barrier technologies facilitate presenting two vertically interleaved stereo images on the display 118g to form the 3D surround view images rendered by the apparatus 100 in real time (e.g., on the fly). In various embodiments, the display 118g implemented as an autostereoscopic display may be positioned so that one eye of the viewer (e.g., the driver) sees one of the two images and the other eye of the viewer (e.g., the driver) sees the other of the two images to produce the stereoscopic effect. In some embodiments, the display 118g may be adjustable (moveable) to allow optimization for the position of the viewer (e.g., the driver). In some embodiments, the infotainment system 400 may only display one view at a time. The number and/or types of video views provided by the infotainment system 400 may be varied according to the design criteria of a particular implementation.

The apparatus 100 may implement a configuration mode and a regular use mode of operation. During the configuration mode the driver 202 may select a camera view using the buttons 410a-410f (e.g., a top view, lateral view, backward view, the front view 402, the top-down view 404, etc.). If the driver 202 wants to set one of the views as the desired view, the driver 202 may press the save button 412. The processors 106a-106n may receive the view selection input in response to the buttons 410a-410f and generate the output video signal VOUT_A-VOUT_N to select the view for the displays 118a-118n in response to said view selection input.

The views available may be based on the output VOUT_A-VOUT_N presented by the processors 106a-106n and/or the views captured by the capture devices 102a-102n. Generally, at least five different views may be available (e.g., each individual portion of the all-round view 254a-254d and the top-down view generated in response to the all-round views 254a-254d). Other views may be available based on video data captured by each of the capture devices 102a-102n (including views of the interior of the ego vehicle 50). Other views may be generated by overlaying, stitching and/or dewarping the video frames FRAMES_A-FRAMES_N from one or more of the capture devices 102a-102n. The number and/or type of views available from the apparatus 100 may be varied according to the design criteria of a particular implementation.

In the configuration mode, pressing the save button 412 (e.g., a save preferences input) may cause the processor 106a-106n to store the precise, current location of the ego vehicle 50, the current gear of the ego vehicle 50 (e.g., forward, reverse, neutral, etc.) and the selected camera view in the database 174 (e.g., based on the view selected using the view selection buttons 410a-410f). In one example, a location of the ego vehicle 50 may be determined by the GPS/GNSS coordinates received from the sensor 114 (e.g., in the case when the GPS provides an accurate GPS measurement). In another example, the location of the ego vehicle 50 may be determined in response to features detected in the video frame(s) captured by the capture devices 102a-102n. In an example, a computer vision based localization determined using image features may be preferred because the image features may provide a higher accuracy of the localization. For example, low-cost GPS systems usually available on vehicles provide a location with accuracy of approximately a few meters. Image-based localization may be as precise as a few centimeters. When image-based localization is implemented, the database 174 may store a sufficient number of features in order to recognize the location again during the regular mode of operation. In one example, the processors 106a-106n may perform the computer vision precise localization according to "Vision Only Localization", Henning Lategahn and Christoph Stiller (IEEE Transactions on Intelligent Transportation Systems, vol 15, no. 3, June 2014, pp. 1246-1257), appropriate portions of which are hereby incorporated by reference.

During the regular use mode of operation, the apparatus 100 may be configured to operate without interaction from the driver 202. The processors 106a-106n may be configured to automatically switch one or more of the displays 118a-118n to a desired 3D view or camera view when a current location of the ego vehicle 50 matches the stored location for one of the camera views in the database 174. The processors 106a-106n may switch to the desired view based on the current location and the preferences of the driver 202 without the driver 202 intervening on the infotainment system 400. For example, the driver 202 may drive the ego vehicle 50 and when the decision module 158 determines that the position of the ego vehicle 50 matches one of the previously stored positions (e.g., saved by pressing the save button 412 in the configuration mode of operation) and the selected gear (e.g., the current status of the ego vehicle 50) matches the gear stored (e.g., the stored vehicle status) in the same entry of the database 174, the processors 106a-106n may select one of the video output signals VOUT_A-VOUT_N according to the same entry of the database 174 (e.g., the desired view).

In order to quickly compare a potentially large amount of data in the database 174 to the currently detected feature set in real-time, the entries in the database 174 may be filtered according to the approximate location determined by the GPS sensor 114. For example, the features detected in the incoming video frames FRAMES_A-FRAMES_N may only be compared to the filtered entries in the database 174 to limit the amount of processing performed by the processors 106a-106n. In an example, the database 174 may be filtered by the database entries that are within a pre-determined distance from the current GPS coordinates (e.g., within a few miles, within a few kilometers, within a few meters, etc.).

The infotainment system 400 (e.g., the HMI) may further provide the reset (or forget) button 414. When the driver 202 presses the save button 412, the processors 106a-106n may add an entry to the database 174 comprising the current position of the ego vehicle 50, the selected camera view (e.g., based on the input from the buttons 410a-410f), and/or the current gear (e.g., the current status determined from the CAN bus interface 104). The reset button 414 may be configured to remove entries from the database 174. In one example, in the configuration mode of operation when the driver 202 presses the reset button 414 (e.g., the processors 106a-106n receive a reset input), then the processors 106a-106n may delete any entry currently present in the database 174 that may be associated with the current position of the ego vehicle 50. In another example, when the driver 202 presses the reset button 414, then the processors 106a-106n may delete multiple entries in the database 174 that correspond to a pre-determined radius from the current position of the ego vehicle 50 (e.g., the radius may be a user-selected variable).

The storage of the current location of the ego vehicle 50 using the image features may be possible when there is a sufficient number of image features detected by the processors 106a-106n. In some embodiments, the apparatus 100 may be configured to implement the CNN module 150 to perform the feature detection used to extract the image features and/or the object detection. In some embodiments, the apparatus 100 may be configured to implement the computer vision pipeline portion 162 to perform the computer vision algorithm in order to perform the feature detection used to extract the image features and/or the object detection. Generally, any descriptions of the feature detection, the object detection and/or the extraction of the image features by the processors 106a-106n (or the apparatus 100) may be applicable to embodiments of the apparatus 100 that implement the CNN module 150 and/or the computer vision pipeline portion 162. The implementation of the image feature detection and/or the object detection by the processors 106a-106n may be performed by dedicated hardware (e.g., performed on-chip and without uploading data to an external computing resource such as a cloud processing server). The implementation of the image feature detection and/or the object detection by the apparatus 100 may be varied according to the design criteria of a particular implementation.

Localization may be unreliable with insufficient image features. To indicate to the driver 202 that the captured video frames FRAMES_A-FRAMES_N have been analyzed by the processors 106a-106n and comprise enough of the image features to provide the precise localization, the signal VCTRL may be generated to initiate an audio message (e.g., one of the actuators 116 may be a speaker). The processors 106a-106n may be configured to reject storing image features sets with insufficient image features (e.g., the location may not be clearly identifiable because the environment is too dark, the capture devices 102a-102n are dirty, the view of the capture devices 102a-102n is obstructed, the capture devices 102a-102n are too close to objects, etc.).

To prevent driver distraction and/or avoid inconsistent use, the apparatus 100 may be configured to enable the user to interact with the infotainment system 400 when the ego vehicle 50 is moving at a low speed or stopped. For example the processors 106a-106n may be configured to lock out input from the buttons 410a-410f, the save button 412 and/or the reset button 414 when the ego vehicle 50 is traveling above a threshold speed (e.g., 5 km/h). In some embodiments, the infotainment system 400 may implement a touch screen interface (e.g., software buttons). The touchscreen interface for the infotainment system 400 may collapse (e.g., combine) the two buttons 412-414 into a single button that changes functionality (e.g., the save input and/or the reset input) in response to a context. For example, the combined software button may be considered "pressed" when the ego vehicle 50 is in an identified location, and "not pressed" in other cases. For example, when the precise location of the ego vehicle 50 matches one of the entries of the database 174, then the combined software button moves automatically to the "pressed" position (e.g., eventually emitting a sound to notify the driver 202 that a known location has been reached) and the apparatus 100 may switch to the preferred camera view. In another example, when the driver 202 wants the apparatus 100 to forget a particular camera switch (e.g., delete one of the entries in the database 174), the driver 202 may press the combined software button again and bring the combined software button to the "non pressed" state.

Figure 7:
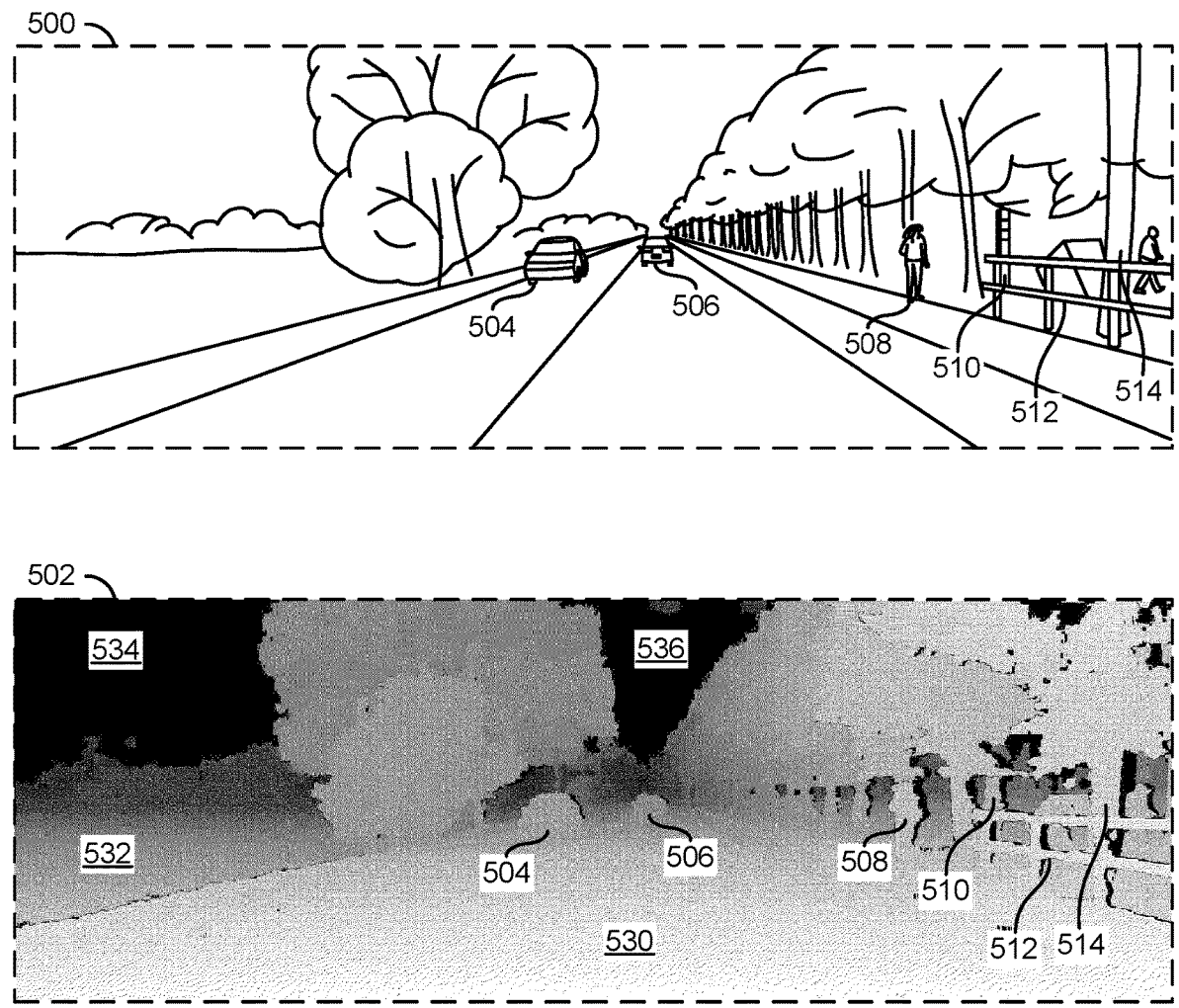
FIG. 7 is a diagram illustrating an example of a disparity image.

Referring to FIG. 7, a diagram illustrating an example of a camera image and a corresponding disparity image is shown. A disparity image is an image that encodes distances. A 2D image 500 and a disparity image 502 of a view from the front of the ego vehicle 50 are shown. In an example, the disparity image 502 may be a representative example of a disparity image generated by the disparity engine 164 of the processors 106a-106n. The disparity image 502 may comprise data from multiple input images (e.g., a left video frame and a right video frame from a stereo camera). The disparity image 502 may comprise disparity values using grayscale as an encoding key. In other words, a pixel may have a grey tone which is proportional to the distance of the object the pixel represents. In the example shown, a density of dots may represent a distance from the capture devices 102a-102n that captured the pixel data used for generating the disparity image 502. Generally, in some visual representations of disparity values, a different color may indicate a different distance of the objects from the capture devices 102a-102n. Using the disparity image 502, the processors 106a-106n may use calibration data (e.g., distances between lenses, angle of the lenses with respect to each other, etc.) to convert disparity values to distance (or depth) values.

The 2D image 500 and the disparity image 502 may comprise a view from the perspective of the capture devices 102a-102n. The 2D image 500 and the disparity image 502 may comprise objects 504-514. The object 504 may be an oncoming vehicle in a lane adjacent to the lane in which the ego vehicle 50 is traveling. The object 506 may be a second vehicle traveling in the same lane as the ego vehicle 50. The object 508 may be a pedestrian standing on a side of the road. The object 510 may be a sign post. The object 512 may be a fence along the side of the road. The object 514 may be a tree on the side of the road behind the fence 512. The objects 504-514 are shown at various distances from the capture devices 102a-102n (not shown) that captured the pixel data used to generate the disparity image 502. In an example, the tree 514 is lighter (e.g., a lower grayscale or density of dots) than the other objects 504-512 because the tree 514 is closer to the capture devices 102a-102n (not shown) that captured the pixel data used to generate the disparity image 502.

A region 530, a region 532, a region 534, and a region 536 are shown. The region 530 may be a region nearest to the capture devices 102a-102n. The region 532 may be a region a medium distance from the capture devices 102a-102n. The regions 534 and 536 may be regions farthest from the capture devices 102a-102n (e.g., extending to a horizon). The regions 530-536 may be general approximations of distance shown for illustrative and/or descriptive purposes. Generally, the disparity values may provide accurate measurements of distances that may be any measured value. The nearby region 530 is shown generally lighter (or having a lower density of dots). The middle region 532 is shown generally as a darker gray (or having a medium density of dots). The far regions 534 and 536 are shown generally as dark gray (or having a high density of dots). The number of regions and/or distances to objects measured using the disparity values and/or the calibration data may be varied according to the design criteria of a particular implementation. Using the disparity values, the processors 106a-106n may be configured to determine how far away objects are from the capture devices 102a-102n.

Since images captured by the capture devices 102a-102n provide a two dimensional projection of a three dimensional environment, there may be difficulties in distinguishing where objects are oriented with respect to each other in the 2D image 500. For example, based on height, the vehicle 506 may appear to be smaller than the pedestrian 508. However, the pedestrian 508 may be located closer to the capture devices 102a-102n (e.g., in the near region 530) than the vehicle. The disparity values in the disparity image 502 may be used as another source of data that the processor 106a-106n may use to recognize objects, classify objects, determine a size of an object and/or a determine spatial relationships of objects.

Figure 8:
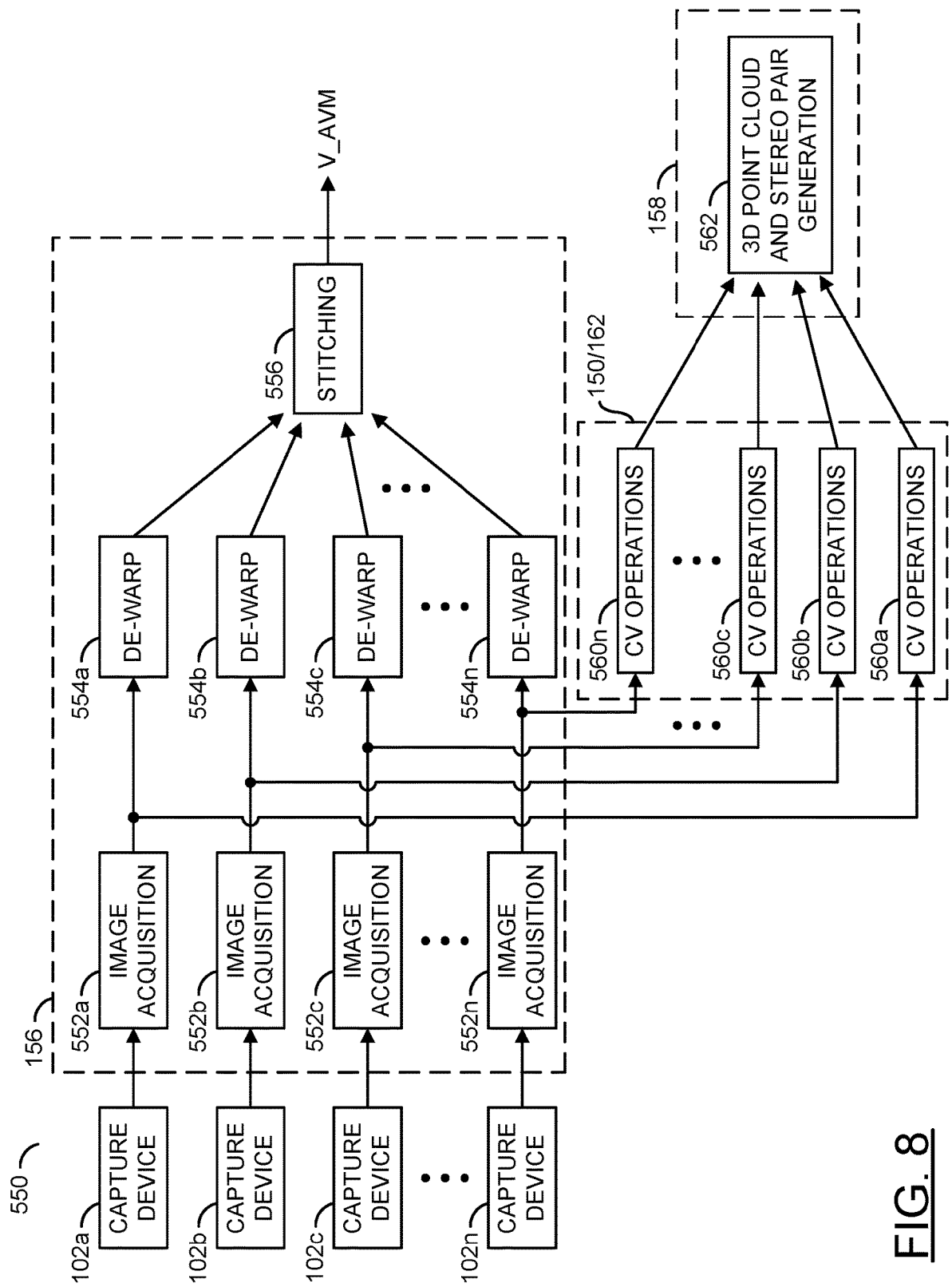
FIG. 8 is a diagram illustrating generating vertically interleaved stereo images during image acquisition.

Referring to FIG. 8, a diagram illustrating generation of a 3D point cloud and stereo pair during image acquisition is shown. A representation of the image acquisition process 550 by the apparatus 100 is shown. The image acquisition process 550 may comprise the capture devices 102a-102n, the video processing pipeline 156, the CNN module 150, the decision module 158, and/or the computer vision pipeline portion 162. For an example where the apparatus 100 generates the all-round view 254a-254n, four of the capture devices 102a-102n may be implemented and an output signal (e.g., V_AVM) may be generated as one of the signals VOUT_A-VOUT_N to provide the dewarped and stitched together single bird's-eye view. The capture devices 102a-102n may be implemented as stereo cameras (e.g., two images sensors each). The capture devices 102a-102n may be intercalibrated to facilitate fusion of respective point clouds generated for the views of each of the capture devices 102a-102n.

The video processing pipeline 156 may comprise blocks (or circuits) 552a-552n, blocks (or circuits) 554a-554n and/or a block (or circuit) 556. The blocks 552a-552n may implement image acquisition modules. The blocks 554a-554n may implement dewarping modules. The block 556 may implement a video stitching module. In embodiments implementing the video processing pipeline portion 162, the video processing pipeline portion 162 may be within the video processing pipeline 156. The image acquisition modules 552a-552n, the dewarping modules 554a-554n and/or the video stitching module 556 may each be conceptual blocks that may be comprised of various circuitry, logic and/or sub-modules. The conceptual blocks may represent a flow of data through the video pipeline 156 for the purpose of generating the all-round views 254a-254d. The video pipeline 156 may comprise other components and/or interconnections (not shown). The number, type and/or arrangement of the components of the video processing pipeline 156 may be varied according to the design criteria of a particular implementation.

The capture devices 102a-102n may be configured to capture current video frames (e.g., record video as the ego vehicle 50 drives around the environment). The capture devices 102a-102n may be intercalibrated. The current incoming video frames (e.g., the signals FRAMES_A-FRAMES_N) may be transmitted to the video processing pipeline 156. The image acquisition modules 552a-552n may each be configured to receive the current video frames from one of the capture devices 102a-102n. The image acquisition modules 552a-552n may perform various video processing operations. For example, the image acquisition modules 552a-552n may be configured to perform encoding, enhancements, downscaling, packetizing, compression, conversion, blending, synchronizing and/or other video operations. The image acquisition modules 552a-552n may be configured to present the processed video frames to the dewarping modules 554a-554n, the CNN module 150 and/or the computer vision pipeline portion 162.

The dewarping modules 554a-554n may be configured to receive the processed video frames from the image acquisition modules 552a-552n. The dewarping modules 554a-554n may be configured to correct distortion in the processed video frames. For example, the dewarping modules 554a-554n may be configured to perform rolling shutter correction, stabilizing, wide angle lens correction, etc. For example, the dewarping modules 554a-554n may be configured to correct each of the views 254a-254d to provide a rectilinear video frame. The dewarped video frames may be presented to the video stitching module 556.

The video stitching module 556 may be configured to receive the dewarped video frames from the dewarping modules 554a-554n. The video stitching module 556 may be configured to combine dewarped video frames to generate a video frame that combines multiple fields of view into a stitched video frame. The stitched video frame may comprise a relatively seamless attachment of multiple dewarped video frames to provide a field of view that has more video data than any one of the fields of view captured by any one of the individual capture devices 102a-102n.

The 3D point cloud and stereo pair operations may be performed in parallel with the video processing operations in the video processing pipeline 156. In the example shown, the processed video frames generated by the image acquisition modules 552a-552n may be presented to the CNN module 150 and/or the computer vision pipeline portion 162. In some embodiments, the dewarped video frames generated by the dewarping modules 554a-554n may be presented to the CNN module 150 and/or the computer vision pipeline portion 162 (e.g., objects and/or image features may be more easily recognized in a dewarped video frame). In an example, the image acquisition process 550 may be configured to generate a bird's-eye view, generate four 3D point clouds for the views 254a-254d, fuse the four 3D point clouds to create a dense 3D point cloud representing all the surrounding environment (e.g., road, pavement, steps, objects, other cars, etc.) of the ego vehicle 50, and generate pairs of vertically interleaved stereo images. In an example, two stereo images are acquired for each of the capture devices 102a-102n and stereo reconstruction (e.g., image disparity computation, etc.) is performed. Based on the stereo reconstruction, a dense 3D point cloud is generated for each of the four stereo cameras. The four point clouds are then fused together to generate the single point cloud representing the surround environment. In an example, the image acquisition process 550 may have extended functionality of video analysis to determine a precise localization, to highlight obstacles, to locate and highlight objects (e.g., lane markings that represent a parking space, etc.), etc.

The CNN module 150 and/or the computer vision pipeline portion 162 may comprise blocks (or circuits) 560a-560n. The blocks 560a-560n may be various modules configured to perform computer vision operations. In the example shown, the computer vision operations may be optimized for image feature detection (e.g., extracting the image features from the current video frames). The CNN module 150 and/or the computer vision pipeline portion 162 may comprise various modules each configured and/or tuned for a particular type of computer vision operations (not shown). The number, type and/or arrangement of the components and/or modules of the CNN module 150 and/or the computer vision pipeline portion 162 may be varied according to the design criteria of a particular implementation.

The computer vision operation modules 560a-560n may be configured to implement a standard QR code identification of the processed (or dewarped) video frames. The computer vision operation modules 560a-560n may be configured to implement stereo reconstruction (e.g., image disparity computation, etc.). The computer vision operation modules 560a-560n may be further configured to implement feature extraction of the processed (or dewarped) video frames. The additional processing required to extract QR codes position and/or image features may run on the onboard processing engine of the processors 106a-106n, which is also responsible for the generation of the all-round view 254a-254d (e.g., no additional processing systems are needed and all operations are performed on-chip). The information extracted by the computer vision operations modules 560a-560n (e.g., the image features and/or the unique marker 510) may be presented to the decision module 158.

The decision module 158 may comprise a block (or circuit) 562. The block 562 may implement a 3D point cloud and stereo pair generation module. The 3D point cloud and stereo pair generation module 562 may be configured to generate the point cloud representing the surround environment of the ego vehicle 50. The 3D point cloud and stereo pair generation module 562 may be further configured to generate vertically interleaved stereo images that may be displayed to the driver 202 using the 3D display implemented in the displays 118a-118n. The decision module 158 may comprise other modules (not shown). The other modules may be implemented for making various other decisions (e.g., collision avoidance, lane departure assistance, autonomous driving, etc.). The number, type and/or arrangement of the modules and/or components of the decision module 158 may be varied according to the design criteria of a particular implementation.

Figure 9:
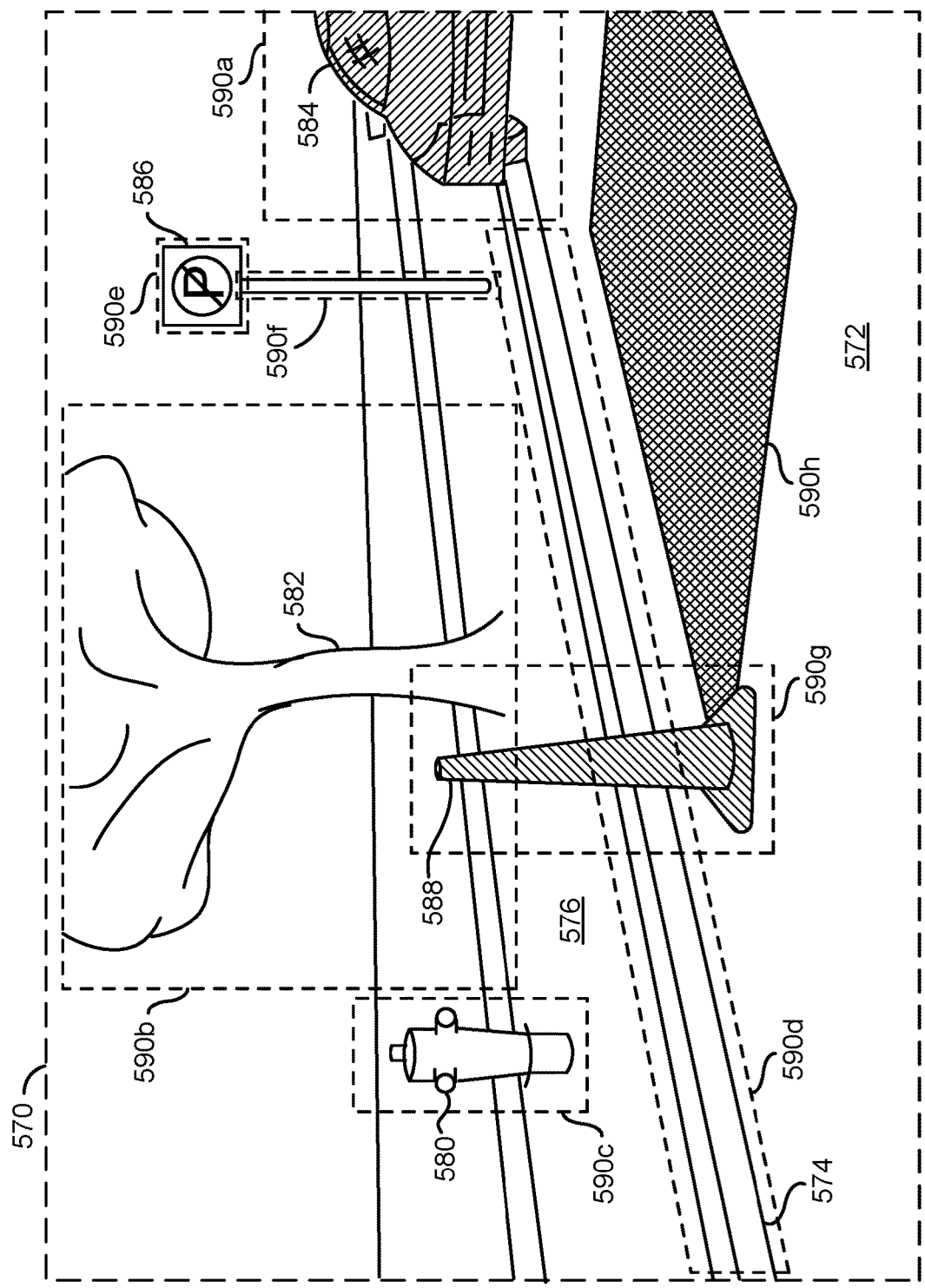
FIG. 9 is a diagram illustrating performing object detection in a video frame.

Referring to FIG. 9, a diagram illustrating performing object detection in a video frame is shown. An example video frame 570 is shown. In an example, the video frame 570 may be a representative example of a video frame from a sequence of video frames generated in response to pixel data captured by the capture devices 102a-102b. In an example, the video frame 570 may be one video frame of a stereo pair of video frames. In an example, the video frame 570 may provide a side view with respect to the ego vehicle 50. In the example shown, the example video frame 570 may be a video frame generated in response to pixel data captured by the passenger side stereo capture device 102i. The example video frame 570 may represent a video frame used by the processors 106a-106n to detect various objects utilizing data from computed disparity images.

The example video frame 570 may comprise a view of the environment near the ego vehicle 50. The example video frame 570 may comprise a road 572, a curb 574, and a sidewalk area 576. The road 572 may be the road surface that the ego vehicle 50 may be currently driving on. The road 572 shown may be the road surface next to the passenger side of the ego vehicle 50. The curb 574 may separate the road from the sidewalk area 576 (e.g., an area where the ego vehicle 50 may not be intended to, or permitted to, drive on). The curb 574 may be an indication of a location where the ego vehicle 50 may autonomously perform parallel parking. For example, the processors 106a-106n may perform the object detection to detect the curb 574 and an open space on the roadway 572 and the decision module 158 may determine that the ego vehicle 50 may park next to the curb 574.

The example video frame 570 may further comprise an object 580, an object 582, an object 584, an object 586, and an object 588. The object 580 may be a fire hydrant. The object 582 may be a tree. The object 584 may be a vehicle. The object 586 may be a sign. The object 588 may be a tall and narrow pylon. The fire hydrant 580 may be located on the sidewalk area 576. The tree 582 may be located on the sidewalk area 576. The vehicle 584 may be parked on the road 572. The sign 586 may be located on the sidewalk area 576. The tall and narrow pylon 588 may be located on the road 572. The disparity images generated by the processors 106a-106n may improve a success rate and/or confidence level of results of object detection performed by the processors 106a-106n on the example video frame 570.

Dotted boxes 590a-590h are shown. The dotted boxes 590a-590h may represent computer vision operations performed by the processors 106a-106n. In an example, the dotted boxes 590a-590h may encompass object detections obtained through the computer vision operations performed by the processors 106a-106n. The detection 590a may represent a detection of the vehicle 584. The detection 590b may represent a detection of the tree 582. The detection 590c may represent a detection of the fire hydrant 580. The detection 590d may represent a detection of the curb 574. The detection 590e may represent a detection of the sign 586. The detection 590f may represent a detection of a signpost of the sign 586. The detection 590g may represent a detection of the tall and narrow pylon 588. The detection 590g may represent a detection of free space (e.g., an open parking space, etc.) on the road 572 near the curb 574. In an example, the dotted boxes 590a-590h may be a visual representation of the object detection (e.g., the dotted boxes 590a-590h may not appear on an output video frame displayed on one of the displays 118a-118n). Instead, one or more of the objects 580-588 may be highlighted (e.g., shaded, colored, underlined, etc.) to make the driver 202 aware of the objects presence. In an example, the objects highlighted may represent obstacles to a maneuver being performed by the driver 202 or the ego vehicle 50. In another example, each of the dotted boxes 590a-590h may be a bounding box generated by the processors 106a-106n displayed on the video frame to indicate that an object has been detected (e.g., the bounding boxes 590a-590h may be displayed in a debug mode of operation). The number and/or types of objects detected by the processors 106a-106n may be varied according to the design criteria of a particular implementation.

The object detection performed by the CNN module 150 may comprise a confidence level. The confidence level may provide an indication of how likely that the results of the object detection are accurate. For example, a low confidence level may indicate that the results of the object detection may be unreliable (e.g., inaccurate, have errors, etc.) and a high confidence level may indicate that the results of the object detection may be reliable (e.g., other systems of the ego vehicle 50 may use the results of the object detection, the processors 106a-106n may generate signals such as the signal VCTRL based on the results of the object detection, etc.). The memory 108 may store pre-determined confidence level thresholds for various functions of the processors 106a-106n.

The confidence level threshold may comprise a value of the confidence level of the results generated by the CNN module 150 that may be considered to be reliable (e.g., unreliable results below the confidence level threshold and reliable results above the confidence level threshold). In an example, if the processors 106a-106n detect the fire hydrant 580, the tree 582, the vehicle 584, the sign 586 and/or the tall and narrow pylon 588 with a confidence level greater than the threshold value, then the processors 106a-106n may generate the signal VCTRL to enable some type of response (e.g., autonomously perform vehicle maneuver, provide a warning to the driver 202, provide data to another system, etc.).

In some embodiments, the processors 106a-106n may be configured to detect, recognize and/or classify the detected objects 590a-590h. The processors 106a-106n may be further configured to infer depth by performing the analysis on the example video frame 570. The capture devices 102a-

102*n* may provide disparity values that may be used to calculate the depth information. The disparity values may be determined for objects that are relatively large and/or relatively wide (e.g., with a high confidence). For example, the disparity image may provide disparity values that may be used to infer depth information for the curb 574, the fire hydrant 580, the tree 582 and/or the vehicle 584.

The CNN module 150 may be configured to generate a virtual disparity image. The virtual disparity image may provide additional data points that may be used by the processors 106*a*-106*n* to infer depth information. For example, the additional data points provided by the virtual disparity image may provide more reliable (e.g., accurate) disparity values for the tall and narrow objects (e.g., the tall and narrow pylon object 590*g* and the signpost object 590*f*. The additional data points provided by the virtual disparity image may enable the processor 106*a*-106*n* to infer depth information that may not be usable (or reliable) using the disparity data from the capture devices 102*a*-102*n* alone.

Inferring depth (e.g., a distance of a 3D point with respect to a camera) from monocular images may not be reliable due to images providing a projection of a 3D world point onto the 2D image plane. The projection causes the depth information to be lost. Without disparity values, the depth information may be computed by the processors 106*a*-106*n* at best up to a scale factor and generally using additional information such as camera motion and/or object geometry. Multiple views of the same scene (e.g., captured using the capture devices 102*a*-102*n*) may enable the processors 106*a*-106*n* to re-construct the depth of a scene via point triangulation, provided that the length of the baseline in world units and the camera calibration parameters are known.

Figure 10A:
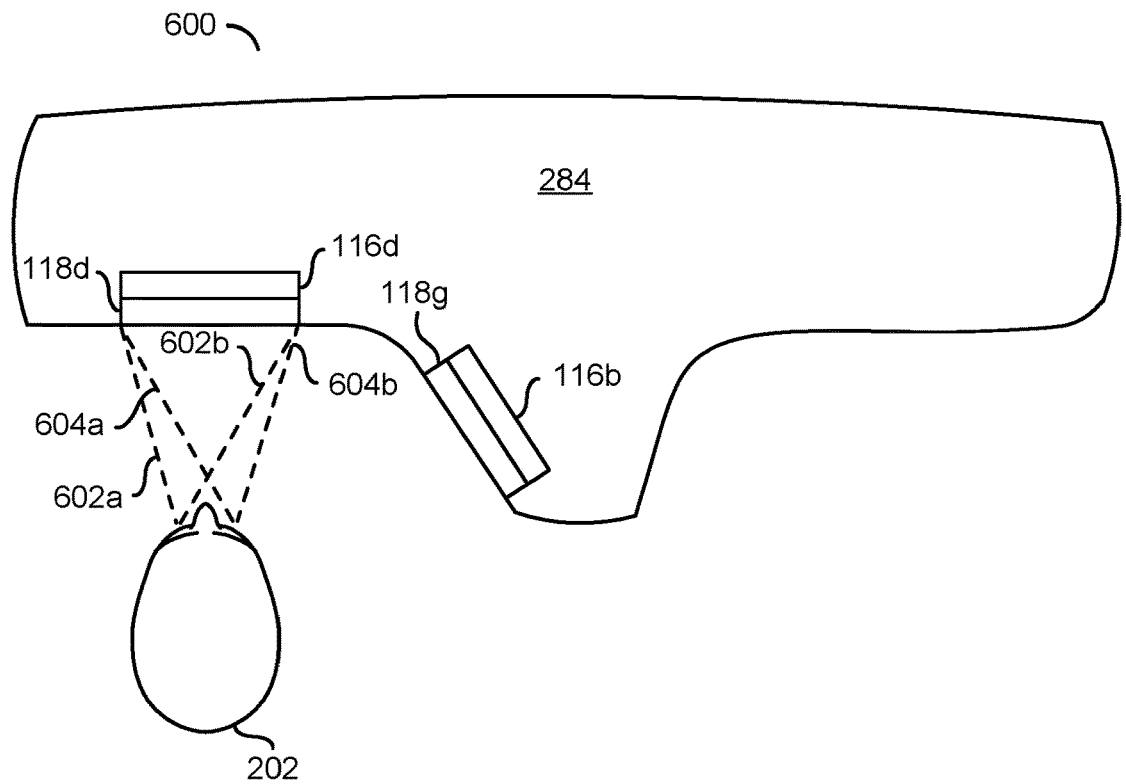
FIGS. 10A-10B are diagrams illustrating displaying vertically interleaved stereo images to a driver of a vehicle in accordance with an embodiment of the invention.

Referring to FIG. 10A, a diagram is shown illustrating vertically interleaved stereo images in accordance with an embodiment of the invention being displayed to a driver of a vehicle. A view 600 of a portion of an interior of the ego vehicle 50 is shown. In an example, the vertically interleaved stereo images generated by the 3D point cloud and stereo pair generation module 582 may be communicated to the 3D display implemented in the displays 118*a*-118*n* (e.g., via a communication bus of the vehicle 50, using a wireless protocol, etc.). The vertically interleaved stereo images generated by the 3D point cloud and stereo pair generation module 582 may be displayed to the driver 202 using the 3D display implemented in the displays 118*a*-118*n*. In an example, the 3D display may be implemented in the display 118*d* directly in front of the driver 202.

In an example, the display 118*d* may be configured to direct a first of the two vertically interleaved stereo images (e.g., represented by a line 602*a* and a line 602*b*) to a left eye of the driver 202 and a second of the two vertically interleaved stereo images (e.g., represented by a line 604*a* and a line 604*b*) to a right eye of the driver 202. In an example, the display 118*d* may be adjustable by the driver 202 to optimize the 3D experience based on the position and/or height of the driver 202. In an example, a position of the display 118*d* may be adjusted manually. In an example, a position of the display 118*d* may be adjustable using one of the actuators 116*a*-116*n*. In an example, an actuator 116*d* may be attached to the display 118*d*. In an example, the actuator 116*d* may be configured to allow the driver 202 to adjust the display 118*d* using a control pad and/or buttons similarly to adjusting a side view mirror. In another example, the driver monitoring system 288 may be configured to control the actuator 116*d* to adjust the display 118*d* based on determination of eye positions of the driver 202.

Figure 10B:
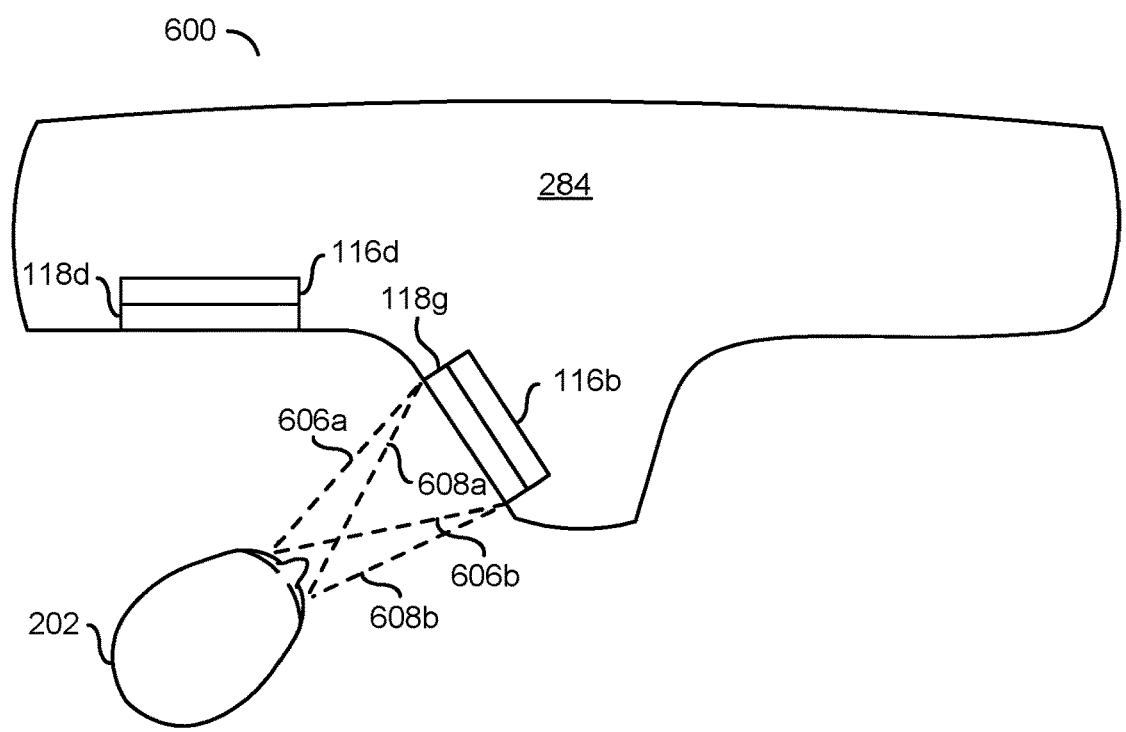

Referring to FIG. 10B, a diagram is shown illustrating vertically interleaved stereo images in accordance with an embodiment of the invention being displayed to a driver of a vehicle. The view 600 of the portion of the interior of the ego vehicle 50 is shown. In an example, the vertically interleaved stereo images generated by the 3D point cloud and stereo pair generation module 582 may be communicated to the 3D display implemented in the display 118*g*. The vertically interleaved stereo images generated by the 3D point cloud and stereo pair generation module 582 may be displayed to the driver 202 using the 3D display implemented in the display 118*g*. In an example, the 3D display may be implemented in the display 118*g* in a console adjacent to the driver 202.

In an example, the driver 202 may view the 3D display implemented in the display 118*g* by a simple turn of the head. In an example, the display 118*g* may be configured to direct a first of the two vertically interleaved stereo images (e.g., represented by a line 606*a* and a line 606*b*) to the left eye of the driver 202 and a second of the two vertically interleaved stereo images (e.g., represented by a line 608*a* and a line 608*b*) to the right eye of the driver 202. In an example, the display 118*g* may be adjustable by the driver 202 to optimize the 3D experience based on the position and/or height of the driver 202. In an example, a position of the display 118*g* may be adjusted manually. In another example, the position of the display 118*g* may be adjustable using one of the actuators 116*a*-116*n*. In an example, an actuator 116*g* may be attached to the display 118*g*. In an example, the actuator 116*g* may be configured to allow the driver 202 to adjust the display 118*g* using a control pad and/or buttons similarly to adjusting the side view mirror. In another example, the driver monitoring system 288 may be configured to control the actuator 116*g* to adjust the display 118*g* based on determination of eye positions of the driver 202.

Figure 11:
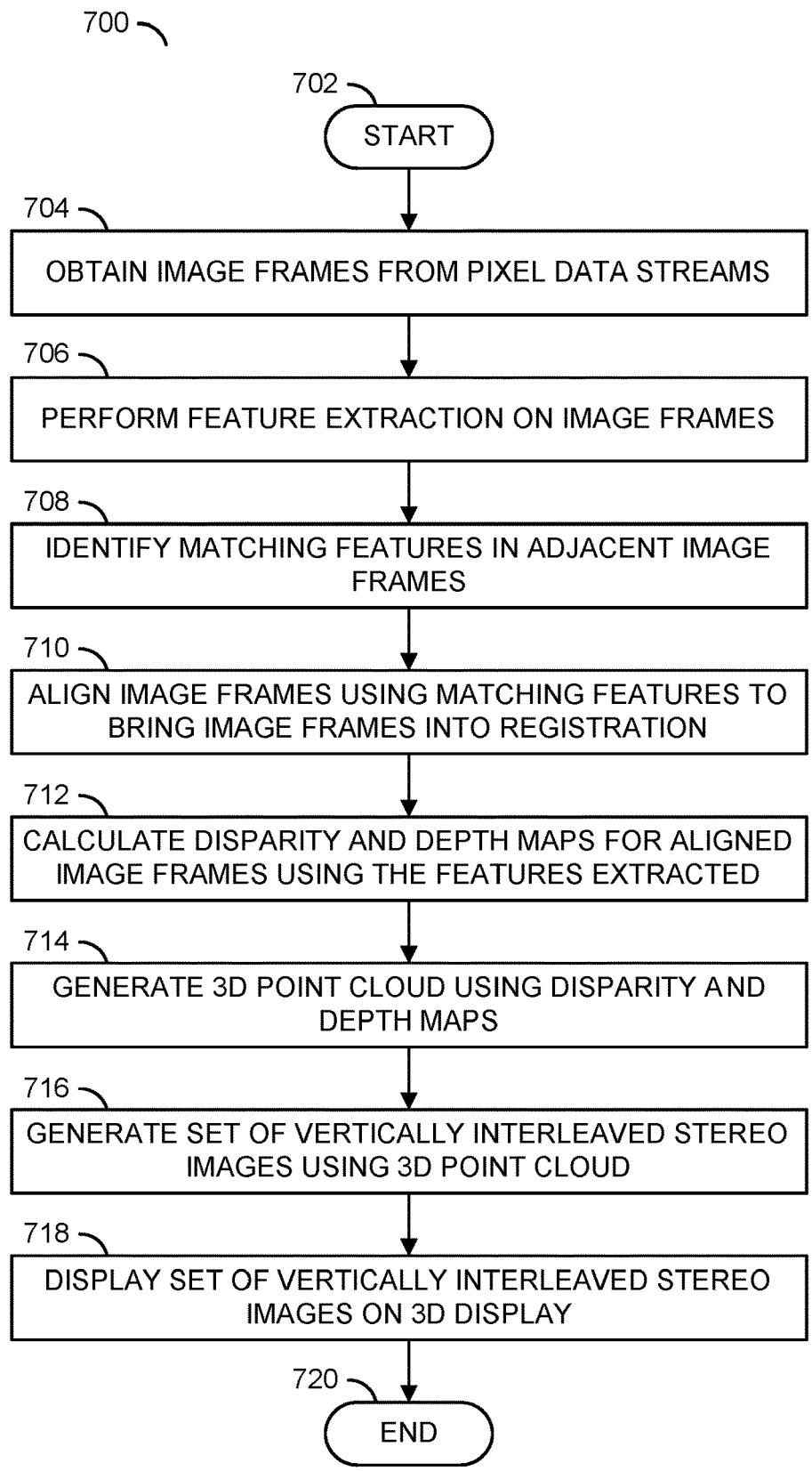
FIG. 11 is a flow diagram illustrating a process in accordance with an embodiment of the invention.

Referring to FIG. 11, a flow diagram is shown illustrating a method (or process) 700 in accordance with an embodiment of the invention. The method 700 may generate a 3D visualization on a 3D display utilizing a 3D point cloud from multiple sources. The method 700 generally comprises a step (or state) 702, a step (or state) 704, a step (or state) 706, a step (or state) 708, a step (or state) 710, a step (or state) 712, a step (or state) 714, a step (or state) 716, a step (or state) 718, and a step (or state) 720. The step 702 may start the method 700. The method 700 may then move to the step 704.

In the step 704, the processors 106*a*-106*n* may obtain image frames from a plurality of pixel data streams. Next, in the step 706, the processors 106*a*-106*n* may perform feature extraction on the images frames. In an example, the features may be determined based on computer vision operations performed by the processors 106*a*-106*n*. Next, the method 700 may move to the step 708. In the step 708, the processors 106*a*-106*n* may identify matching features in adjacent image frames. The method 700 may then move to the step 710. In the step 710, the processors 106*a*-106*n* may align the image frames using the matching features to bring the image frames into registration. The method 700 may then move to the step 712.

In the step 712, the processors 106*a*-106*n* may calculate disparity and depth maps for the aligned image frames using the features extracted. In an example, the processors 106*a*-106*n* may calculate depth (or distance) information for each pixel of the image frames utilizing stereo triangulation. When the depth (or distance) information for each pixel of the image frames has been calculated, the method 700 may move to the step 714. In the step 714, the processors 106a-106n may generate dense 3D point clouds using the disparity and depth maps. The processors 106a-106n may then fuse (combine) the dense 3D point clouds into a single 3D point cloud representing the surround environment of the ego vehicle 50. In the step 716, the processors 106a-106n may generate a set of vertically interleaved stereo images using the fused 3D point cloud. In an example, the set of vertically interleaved stereo images may provide 3D information to the driver 202 of a view facilitating a current maneuver of the ego vehicle 50. In the step 718, the set of vertically interleaved stereo images may be communicated to and displayed on a 3D display of the ego vehicle 50. In the step 720, the method 700 may terminate.

Referring to FIG. 12, a flow diagram is shown illustrating a method (or process) 800 in accordance with an embodiment of the invention. The method 800 may generate a 3D visualization on a 3D display utilizing a 3D point cloud from multiple sources. The method 800 generally comprises a step (or state) 802, a step (or state) 804, a step (or state) 806, a step (or state) 808, a decision step (or state) 810, a step (or state) 812, a step (or state) 814, a step (or state) 816, and a step (or state) 818. The method 800 may begin in the step 802. The method 800 may then move to the step 804.

In the step 804, the method 800 may acquire two stereo image frames from each stereo camera of an all-around view system of the ego vehicle 50. In various embodiments, the stereo cameras of the all-around view system of the vehicle are generally intercalibrated. In an example, the stereo cameras of the all-around view system of the vehicle may be intercalibrated during design and/or production utilizing calibration data (e.g., distances between lenses, angle of the lenses with respect to each other, etc.). In the step 806, the method 800 may generate a dense 3D point cloud for each stereo camera by performing stereo reconstruction (e.g., image disparity computation) on the two stereo image frames from each stereo camera. In an example, the processors 106a-106n may calculate disparity and depth maps for the aligned image frames using extracted features. In an example, the processors 106a-106n may calculate depth (or distance) information for each pixel of the image frames utilizing stereo triangulation. When the depth (or distance) information for each pixel of the image frames has been calculated, the method 800 may move to the step 808.

In the step 808, the method 800 may fuse together the dense 3D point clouds calculated for each stereo camera to generate a single 3D point cloud representing an all-around view of an environment surrounding the ego vehicle 50. In an example, the processors 106a-106n may fuse (combine) the dense 3D point clouds for each of the stereo cameras into a single 3D point cloud representing the surround environment of the ego vehicle 50. When the single 3D point cloud has been generated, the method 800 may move to the decision step 810. In the decision step 810, the method 800 may determine whether to display raw data, so the driver 202 can see the surrounding environment in 3D, or processed data, so the driver 202 sees an enhanced (or augmented) view of the surrounding environment in 3D. In an example, the choice between raw and processed may be implemented as a user configured option of the all-around view system of the ego vehicle 50. When processed data is to be displayed, the method 800 may move to the step 812. When raw data is to be displayed, the method 800 may move to the step 814.

In the step 812, the method 800 may process the raw data to detect objects, highlight (e.g., by underlining, shading, coloring, etc.) obstacles, locate lane markings, etc. utilizing computer vision operations performed by the processors 106a-106n. In the step 814, the method 800 may generate stereoscopic images from data, raw or processed, of the fused 3D point cloud to display a portion or all of the environment surrounding the ego vehicle 50 on the 3D display of the ego vehicle 50. In an example, the processors 106a-106n may generate a set of vertically interleaved stereo images from the fused 3D point cloud. In an example, the set of vertically interleaved stereo images may provide 3D information to the driver 202 showing a view of the environment surrounding the ego vehicle 50 and/or facilitating a current maneuver of the ego vehicle 50. In the step 816, the stereoscopic images (e.g., the set of vertically interleaved stereo images) may be communicated to and displayed on the 3D display of the ego vehicle 50. In the step 818, the method 800 may terminate.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to (i) receive at least four pixel data streams corresponding to an exterior view from a vehicle and (ii) receive a pixel data stream corresponding to a view of an interior said vehicle directed at a driver; and
   a processor configured to (a) process said at least four pixel data streams and said pixel data stream arranged as video frames, (b) calculate depth information for each pixel of said at least four pixel data streams using said video frames, (c) calculate a 3D point cloud by fusing said depth information for each pixel of said at least four pixel data streams, (d) generate 3D images for a display in response to said 3D point cloud, (e) perform dewarping on said video frames to generate dewarped video frames corresponding to said at least four pixel data streams, (f) combine said corresponding dewarped video frames to generate stitched video frames comprising a combined field of view greater than a field of view of one of said at least four pixel data streams for said display, (g) perform computer vision operations on said video frames corresponding to said pixel data stream to (I) determine a location of a right eye of said driver and a location of a left eye of said driver and (II) detect when a head of said driver is turned towards a second implementation of said display implemented in said interior of said vehicle, (h) re-determine said location of said right eye of said driver and said location of said left eye of said driver with respect to said second implementation of said display, (i) present an autostereoscopic image to said second implementation of said display, and (j) generate a control signal, wherein
- (A) said display is configured to direct to said driver (a) said autostereoscopic image and (b) said stitched video frames,
- (B) said display is configured to select between said autostereoscopic image and said stitched video frames,
- (C) said 3D point cloud is calculated in parallel with performing said dewarping of said video frames, and
- (D) said control signal is configured to (a) control an actuator to angle said display in response to said location of said right eye and said location of said left eye and (b) enable said actuator to angle said second implementation of said display in response to said location of said right eye and said location of said left eye.

2. The apparatus according to claim 1, wherein said processor is further configured to calculate said depth information for each pixel of said at least four pixel data streams utilizing stereo triangulation.

3. The apparatus according to claim 1, wherein:
said processor is further configured to generate two vertically interleaved stereo images for presentation on said display in real time; and
said display is configured to direct a first of the two vertically interleaved stereo images to said location of said left eye of said driver and a second of the two vertically interleaved stereo images to said location of said right eye of said driver.

4. The apparatus according to claim 3, wherein said processor is further configured to generate two vertically interleaved stereo images for each of said at least four pixel data streams in real time.

5. The apparatus according to claim 1, wherein said at least four pixel data streams are received from an all-around view camera system of said vehicle.

6. The apparatus according to claim 1, wherein said processor is further configured to display said 3D images to said driver of said vehicle during a low-speed maneuver.

7. The apparatus according to claim 6, wherein said processor is further configured to remove points from said 3D point cloud that are not on a road plane associated with said vehicle.

8. The apparatus according to claim 1, wherein said processor is further configured to store and execute an artificial neural network trained to generate two vertically interleaved stereo images from said 3D point cloud.

9. The apparatus according to claim 1, wherein said processor is further configured to store and execute an artificial neural network trained to generate said depth information for each pixel of said at least four pixel data streams using said video frames.

10. The apparatus according to claim 1, wherein said processor is further configured to highlight objects in said 3D images using one or more colors to bring said objects to the attention of the driver.

11. The apparatus according to claim 10, wherein said processor is further configured to underline objects in said 3D images using one or more colors.

12. The apparatus according to claim 1, wherein said processor is further configured to highlight areas of free space in said 3D images using one or more colors.

13. The apparatus according to claim 1, wherein (i) said display is an infotainment system of said vehicle and (ii) said infotainment system comprises (a) a 3D display configured to direct said autostereoscopic image to said driver and (b) a screen configured to direct said stitched video frames to said driver.

14. The apparatus according to claim 1, wherein said display is configured to output at least one of (a) said stitched video frames, (b) said autostereoscopic image and (c) said video frames corresponding to any one of said at least four pixel data streams.

15. The apparatus according to claim 14, wherein said display is configured to select one or more of (a) said stitched video frames, (b) said autostereoscopic image and (c) said video frames corresponding to any one of said at least four pixel data streams in response to a match of a current location of said vehicle with a pre-defined location.

16. A method of generating a 3D all-around view comprising:
receiving at least four pixel data streams corresponding to an exterior view from a vehicle;
receiving a pixel data stream corresponding to an interior view of said vehicle directed at a driver;
processing said pixel data stream arranged as interior video frames;
calculating depth information for each pixel of said at least four pixel data streams using said at least four pixel data streams arranged as exterior video frames;
calculating a respective 3D point cloud for each of said at least four pixel data streams;
generating a combined 3D point cloud representing an all-around environment of said vehicle by fusing said respective 3D point cloud for each of said at least four pixel data streams;
generating 3D images for a display in response to said combined 3D point cloud;
performing dewarping on said exterior video frames to generate dewarped video frames corresponding to said at least four pixel data streams; and
combining said corresponding dewarped video frames to generate stitched video frames comprising a combined field of view greater than a field of view of one of said at least four pixel data streams for said display;
determine a location of a right eye of said driver and a location of a left eye of said driver in response to performing computer vision operations on said interior video frames corresponding to said pixel data stream;
generating a control signal;
detecting when a head of said driver is turned towards a second implementation of said display in an interior of said vehicle in response to said computer vision operations on said interior video frames;
re-determining said location of said right eye of said driver and said location of said left eye of said driver with respect to said second implementation of said display; and
presenting an autostereoscopic image to said second implementation of said display, wherein
(i) said display is configured to direct to said driver (a) said autostereoscopic image and (b) said stitched video frames, (ii) said display is configured to select between said autostereoscopic image and said stitched video frames,
(iii) said 3D point cloud is calculated in parallel with performing said dewarping of said exterior video frames, and
(iv) said control signal is configured to (a) control an actuator to angle said display in response to said location of said right eye and said location of said left eye and (b) enable said actuator to angle said second implementation of said display in response to said location of said right eye and said location of said left eye.

17. The method according to claim 16, wherein calculating said depth information for each pixel of said at least four pixel data streams comprises performing stereo triangulation.

18. The method according to claim 16, wherein generating said 3D images for said display comprises:
   generating two vertically interleaved stereo images for presentation on said display; and
   using said display to direct a first of said two vertically interleaved stereo images to said location of said left eye of said driver and a second of said two vertically interleaved stereo images to said location of said right eye of said driver.

19. The method according to claim 18, further comprising:
   generating said two vertically interleaved stereo images for each of said at least four pixel data streams; and
   displaying said two vertically interleaved stereo images to said driver in real time during a low speed maneuver.

* * * * *